(12) United States Patent
Abe

(10) Patent No.: US 8,599,517 B1
(45) Date of Patent: Dec. 3, 2013

(54) SPINDLE MOTOR AND DISK DRIVE APPARATUS

(71) Applicant: Nidec Corporation, Kyoto (JP)

(72) Inventor: Hiroyuki Abe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/798,278

(22) Filed: Mar. 13, 2013

Related U.S. Application Data

(60) Provisional application No. 61/727,885, filed on Nov. 19, 2012.

(30) Foreign Application Priority Data

Nov. 19, 2012 (JP) ................................. 2012-252875

(51) Int. Cl.
*G11B 19/20* (2006.01)

(52) U.S. Cl.
USPC ........................................................ 360/99.08

(58) Field of Classification Search
USPC ........................................................ 360/99.08
See application file for complete search history.

(56) References Cited

U.S. PATENT DOCUMENTS

| | | | | |
|---|---|---|---|---|
| 5,930,076 | A * | 7/1999 | Morita ........................ | 360/99.08 |
| 7,122,922 | B2 * | 10/2006 | Xu et al. ........................ | 310/51 |
| 7,190,549 | B2 | 3/2007 | Byun et al. | |
| 8,107,195 | B2 * | 1/2012 | Sugiki ............................ | 360/224 |
| 8,390,953 | B2 * | 3/2013 | Tokunaga ................... | 360/99.08 |
| 8,427,777 | B2 * | 4/2013 | Kodama et al. ............. | 360/98.07 |
| 8,427,779 | B2 * | 4/2013 | Shinji et al. ................. | 360/99.08 |
| 8,451,558 | B2 * | 5/2013 | Watanabe et al. ........... | 360/99.08 |
| 8,508,882 | B1 * | 8/2013 | Tamaoka et al. ............ | 360/99.08 |
| 2007/0127156 | A1 | 6/2007 | Byun et al. | |
| 2008/0037164 | A1 * | 2/2008 | Oh et al. ...................... | 360/99.08 |
| 2008/0068744 | A1 | 3/2008 | Nakazawa et al. | |
| 2012/0050911 | A1 | 3/2012 | Tamaoka et al. | |

FOREIGN PATENT DOCUMENTS

| | | |
|---|---|---|
| JP | 2004-135467 A | 4/2004 |
| JP | 2004-166497 A | 6/2004 |
| JP | 2008-097803 A | 4/2008 |
| JP | 2012-055075 A | 3/2012 |

OTHER PUBLICATIONS

Tamaoka et al., "Spindle Motor Having Magnetic Circuit for Stator and Rotor Magnet, and Storage Disk Drive Having the Same," U.S. Appl. No. 13/033,778, filed Feb. 24, 2011.
Tamaoka et al., "Spindle Motor Having Magnetic Circuit for Stator and Rotor Magnet, and Storage Disk Drive Having the Same," U.S. Appl. No. 13/568,207, filed Aug. 7, 2012.
Abe, "Spindle Motor and Disk Drive Apparatus," U.S. Appl. No. 13/804,726, filed Mar. 14, 2013.

* cited by examiner

*Primary Examiner* — Mark Blouin
(74) *Attorney, Agent, or Firm* — Keating & Bennett, LLP

(57) ABSTRACT

A spindle motor of a disk drive apparatus includes a base unit, a stator, a covered cylindrical rotor hub, a rotor magnet, and a bearing mechanism. The rotor magnet is an Nd—Fe—B bond magnet. The thickness of the rotor magnet in the radial direction is about 0.7 mm or more and about 1.0 mm or less. The distance between the rotor magnet and the stator core in the radial direction is about 0.15 mm or more and about 0.20 mm or less. A torque constant Kt of torque generated between the stator and the rotor magnet is about 4 mN·m/A or more and about 6 mN·m/A or less. A motor constant Km is about 2 mN·m/(A·√Ω) or more and about 4 mN·m/(A·√Ω) or less.

14 Claims, 28 Drawing Sheets

SPINDLE MOTOR AND DISK DRIVE APPARATUS

BACKGROUND OF THE INVENTION

1. Field of the Invention

The present invention relates to a spindle motor and more specifically to a spindle motor for a disk drive apparatus.

2. Description of the Related Art

In the related art, a spindle motor (hereinafter, simply referred to as a "motor") is mounted in a disk drive apparatus such as a hard disk drive. In an outer rotor-type motor disclosed in JP-A-2004-135467, a rotor set includes a rotating hub body of a cup shape and a drive magnet. A stator set includes a stator core and a drive coil wound on the stator core. The drive magnet of the motor disclosed in JPA-2004-135467 is fixed to an inner circumferential surface of an annular standing wall part of the rotating hub body, and faces an outer circumferential surface of the stator core. When the motor is driven, a magnetic action is generated between the drive magnet and the drive coil. Further, JP-A-2008-97803 discloses a motor in which a permanent magnet is disposed to face an outer circumferential side of an electromagnet.

However, in recent years, as thinner disk drive apparatuses are demanded, it is necessary to further reduce the thickness of the motor mounted in the disk drive apparatus.

SUMMARY OF THE INVENTION

According to an exemplary preferred embodiment of the present invention, a spindle motor of a disk drive apparatus includes a base unit, a stator, a rotor hub, a rotor magnet, and a bearing mechanism. The stator includes a stator core and a plurality of coils. The plurality of coils is mounted to the stator core. The stator is disposed above the base unit. The rotor hub includes a cover portion and a side wall portion, and has a covered cylindrical shape. The cover portion is positioned above the stator. The side wall portion extends downward from an outer edge of the cover portion. The rotor magnet is positioned outside the stator in a radial direction thereof and is fixed to an inner circumferential surface of the side wall portion of the rotor hub. The bearing mechanism supports the rotor hub and the rotor magnet to be rotatable with respect to the base unit and the stator. The rotor magnet is made of an Nd—Fe—B bond magnet. The thickness of the rotor magnet in the radial direction is about 0.7 mm or more and about 1.0 mm or less, for example. The distance between the rotor magnet and the stator core in the radial direction is about 0.15 mm or more and about 0.20 mm or less, for example. A torque constant Kt of torque generated between the stator and the rotor magnet is about 4 mN·m/A or more and 6 about mN·m/A or less, for example. A motor constant Km is about 2 mN·m/(A·√Ω) or more and about 4 mN·m/(A·√Ω) or less, for example.

According to another exemplary preferred embodiment of the present invention, a spindle motor of a disk drive apparatus includes a base unit, a stator, a rotor hub, a rotor magnet, and a bearing mechanism. The stator includes a stator core and a plurality of coils. The plurality of coils is mounted to the stator core. The stator is disposed above the base unit. The rotor hub includes a cover portion and a side wall portion, and has a covered cylindrical shape. The cover portion is positioned above the stator. The side wall portion extends downward from an outer edge of the cover portion. The rotor magnet is positioned outside the stator in a radial direction thereof and is fixed to an inner circumferential surface of the side wall portion of the rotor hub. The bearing mechanism supports the rotor hub and the rotor magnet to be rotatable with respect to the base unit and the stator. The rotor magnet is made of an Nd—Fe—B bond magnet. The thickness of the rotor magnet in the radial direction is about 0.7 mm or more and about 1.0 mm or less, for example. The distance between the rotor magnet and the stator core in the radial direction is about 0.15 mm or more and about 0.20 mm or less, for example. A torque constant Kt of torque generated between the stator and the rotor magnet is about 3 mN·m/A or more and about 4.5 mN·m/A or less, for example. A motor constant Km is about 1 mN·m/(A·√Ω) or more and about 2 mN·m/(A·√Ω) or less, for example.

According to various preferred embodiments of the invention, it is possible to generate sufficient torque and to shorten a startup time using a thin motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
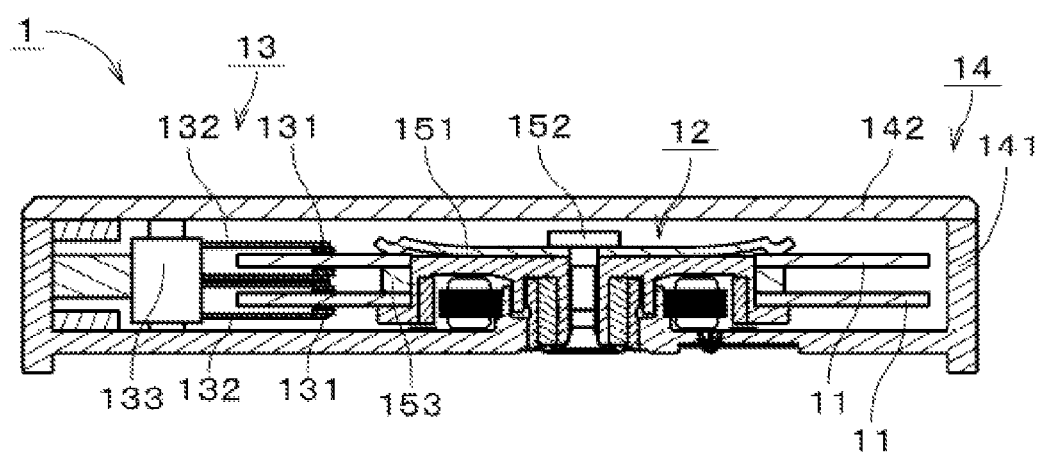
FIG. 1 is a diagram illustrating a disk drive apparatus according to a first preferred embodiment of the present invention.

In the following description, an upper side of a motor in a central axis direction thereof in FIG. 1 is simply referred to as an "upper side", and a lower side thereof is simply referred to as a "lower side". A vertical direction does not represent a positional relationship or a direction when being assembled in an actual device. Further, a direction parallel or substantially parallel to a central axis is referred to as an "axial direction", a direction that is orthogonal or substantially orthogonal to the central axis with reference to the central axis is simply referred to as a "radial direction", and a circumferential direction with reference to the central axis is simply referred to as a "circumferential direction".

Further, in the following description, the "parallel" direction includes both a parallel and an approximately parallel direction. Further, in the following description, the "orthogonal" direction includes both an orthogonal and an approximately orthogonal direction.

FIG. 1 is a longitudinal sectional view illustrating a disk drive apparatus 1 that includes a spindle motor (hereinafter, simply referred to a "motor") according to a first exemplary preferred embodiment of the invention. The disk drive apparatus 1 is preferably a hard disk drive having a width of about 2.5" and a thickness of about 7 mm. The disk drive apparatus 1 preferably includes two disks 11, a motor 12, an access unit 13, a housing 14, and a clamper 151. The motor 12 rotates the disk 11 that stores information. The access unit 13 performs at least one of reading and writing of information with respect to two disks 11. The motor 12 is preferably a three-phase brushless motor.

The housing 14 preferably includes a first housing member 141 and a second housing member 142 of a plate shape. The disk 11, the motor 12, the access unit 13, and the clamper 151 are accommodated inside the first housing member 141. The second housing member 142 is inserted into the first housing member 141 to define the housing 14. It is preferable that an inner space of the disk drive apparatus 1 be a clean space where dust or dirt is not present or is very minute.

Two disks 11 are vertically disposed above and below a spacer 153, and are clamped to the motor 12 by the clamper 151. The access unit 13 includes a head 131, an arm 132, and a head movement mechanism 133. The head 131 moves close to the disk 11 to magnetically perform at least one of reading and writing of information. The arm 132 supports the head 131. As the head movement mechanism 133 moves the arm 132, the head 131 relatively moves with respect to the disk 11. With such a configuration, the head 131 accesses a desired position of the disk 11 in a state where the head 131 moves close to the rotating disk 11.

Figure 2:
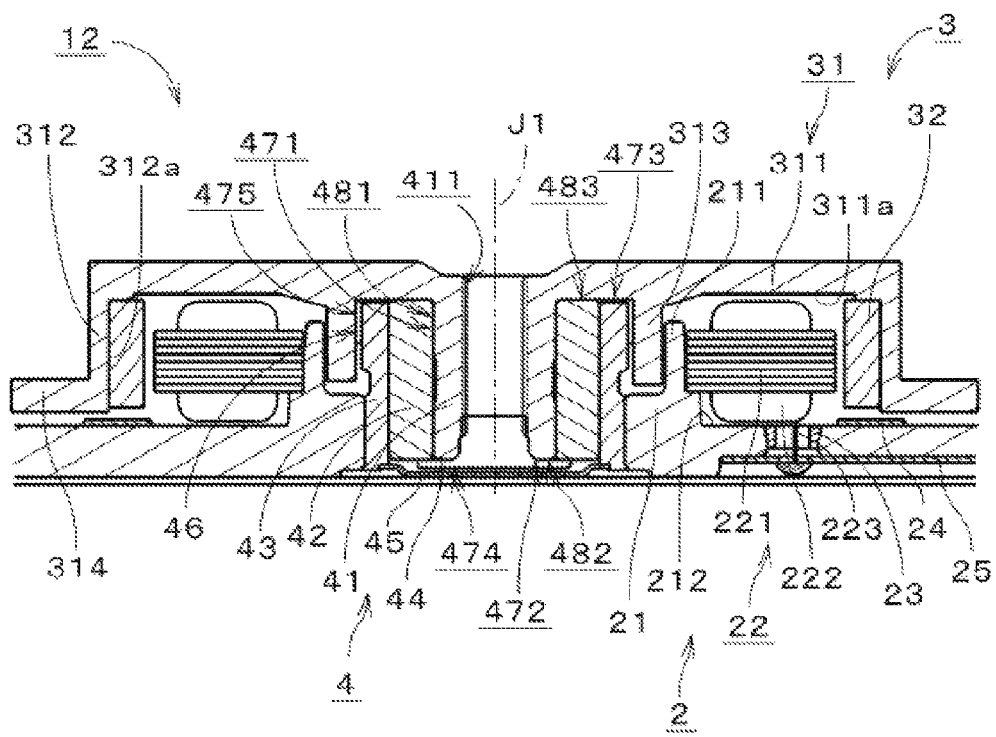
FIG. 2 is a cross-sectional view illustrating a spindle motor according to a preferred embodiment of the present invention.

FIG. 2 is a longitudinal sectional view illustrating the motor 12 according to a preferred embodiment of the present invention. The motor 12 is preferably an outer rotor type, and includes a stationary portion 2 that is a fixed assembly, a rotating portion 3 that is a rotating assembly, and a bearing mechanism 4. The stationary portion 2 preferably includes a base plate 21 that is a base unit having an approximate plate shape, the stator 22, an insulating bushing 23, a magnetic member 24, and a wiring substrate 25. The base plate 21 is a portion of the first housing member 141 in FIG. 1. The stator 22 is disposed above the base plate 21, and preferably includes a stator core 221 and a coil 222. A portion of the stator core 221 in the radial direction is fixed around a cylindrical holder 211 of the base plate 21. The magnetic member 24 has an annular shape with reference to a central axis J1, and preferably is fixed to an upper surface 212 of the base plate 21 by, for example, an adhesive. In the stationary portion 2, a conducting wire 223 of the coil 222 is inserted together with the insulating bushing 23 into a through hole of the base plate 21 in the state of passing through the insulating bushing 23. An end portion of the conducting wire 223 is preferably bonded to the wiring substrate 25 by soldering or the like.

The rotating portion 3 preferably includes a rotor hub 31 and a rotor magnet 32. The rotor hub 31 has an approximately covered cylindrical shape. The rotor hub 31 preferably includes a cover portion 311, a side wall portion 312, a hub tube portion 313, and a disk mounting portion 314. The cover portion 311 is positioned above the stator 22. The hub tube portion 313 has a cylindrical shape with reference to the central axis J1, and extends downward from a lower surface 311a of the cover portion 311 on the outside of the bearing mechanism 4. The side wall portion 312 extends downward from an outer edge of the cover portion 311. The disk drive apparatus 314 extends outward from the side wall portion 312 in the radial direction. The disk 11 in FIG. 1 is mounted on the disk mounting portion 314.

The rotor magnet 32 is fixed to an inner circumferential surface 312a of the side wall portion 312, and is positioned outside the stator 22 in the radial direction. The rotor magnet 32 is a tube portion made of, for example, a neodymium bond magnet (Nd—Fe—B BOND MAGNET). The magnet member is positioned below the rotor magnet 32. A magnetic attraction force is generated between the rotor magnet 32 and the magnetic member 24.

Torque is generated between the stator 22 and the rotor magnet 32 when the motor 12 is driven. A torque constant Kt of the torque generated between the stator 22 and the rotor magnet 32 is preferably about 4 mN·m/A or more and about 6 mN·m/A or less, for example. Further, a motor constant Km is preferably about 2 mN·m/(A·√Ω) or more and about 4 mN·m/(A·√Ω) or less, for example. The motor constant Km is defined as Km=Kt/√(R) using the torque constant Kt and a conducting wire resistance value R of the coil 222.

The bearing mechanism 4 preferably includes a shaft portion 41, a sleeve 42, a sleeve housing 43, a thrust plate 44, a cap portion 45, and a lubricant 46. The shaft portion 41 extends downward from the inner portion of the cover portion 311 in the radial direction. The shaft portion 41 and the rotor hub 31 are preferably defined by a single connected monolithic member. A female screw portion 411 is preferably arranged inside the shaft portion 41 over its entire length. A male screw 152, for example, shown in FIG. 1 is preferably screw-coupled with the female screw portion 411 at the center of the cover portion 311. However, any other type of fastener other than the male screw 152 could be used if so desired. Thus, the clamper 151 is fixed to the motor 12, and the disk 11 is clamped to the rotor hub 31.

A hub clamping method other than the existing clamping method (hereinafter, referred to as a "center clamping method") may alternatively be used. In the hub clamping method, a plurality of female screw portions is defined in the upper surface of the cover portion of the rotor hub, male screws are screw-coupled with the female screw portions, and thus, the clamper is fixed to the motor. In the hub clamping method, since the male screws are fixed to the cover portion, it is preferable to lower the height of the cover portion as much as the height of the male screw. Further, since the male screws are provided in the hub, the hub becomes thick. In a thin motor used by the disk drive apparatus having a thickness of about 7 mm or a thickness of about 5 mm, to be described later, in order to secure a space between the lower surface of the cover portion and the upper surface of the base plate, the center clamping method is effectively used.

The shaft portion 41 is inserted inside the sleeve 42. The sleeve housing 43 is positioned inside the hub tube portion 313. The sleeve 42 is fixed to an inner circumferential surface of the sleeve housing 43. The thrust plate 44 is fixed to a lower portion of the shaft portion 41 as the central male screw portion is screw-coupled with the female screw portion 411. The cap portion 45 is fixed to a lower end of the sleeve housing 43, and blocks a lower opening of the sleeve housing 43.

In the motor 12, the lubricant 46 preferably continuously fills a radial gap 471, a first thrust gap 472, and a second thrust gap 473. The radial gap 471 is a gap between an inner circumferential surface of the sleeve 42 and an outer circumferential surface of the shaft portion 41. The first thrust gap 472 is a gap between a lower surface of the sleeve 42 and an upper surface of the thrust plate 44. The second thrust gap 473 is a gap between an upper surface of the sleeve 42 and an upper surface of the sleeve housing 43, and the lower surface 311a of the cover portion 311. Further, in the motor 12, the lubricant 46 also preferably continuously fills a second thrust gap 474 and a sealing gap 475. The third thrust gap 474 is a gap between a lower surface of the thrust plate 44 and an upper surface of the cap portion 45. The sealing gap 475 is a gap between an inner circumferential surface of the hub tube portion 313 and an upper portion of an outer circumferential surface of the sleeve housing 43.

A radial dynamic pressure groove sequence is provided on the inner circumferential surface of the sleeve 42. Further, a thrust dynamic pressure groove sequence is provided on the upper surface and the lower surface of the sleeve 42. In the radial gap 471, a radial dynamic pressure bearing unit 481 is preferably configured by the radial dynamic pressure groove sequence. In the first thrust gap 472 and the second thrust gap 473, a first thrust dynamic pressure bearing unit 482 and a second thrust dynamic pressure bearing unit 483 are preferably configured by the thrust dynamic pressure groove sequence, respectively. When the motor 12 is driven, the shaft portion 41 and the thrust plate 44 are supported in a non-contact manner with respect to the sleeve 42, the sleeve housing 43, and the cap portion 45 by the radial dynamic pressure bearing unit 481, the first thrust dynamic pressure bearing unit 482, and the second thrust dynamic pressure bearing unit 483, that is, by the bearing mechanism 4. Thus, the rotor hub 31 and the rotor magnet 32 are supported to be rotatable with respect to the base plate 21 and the stator 22.

Figure 3:
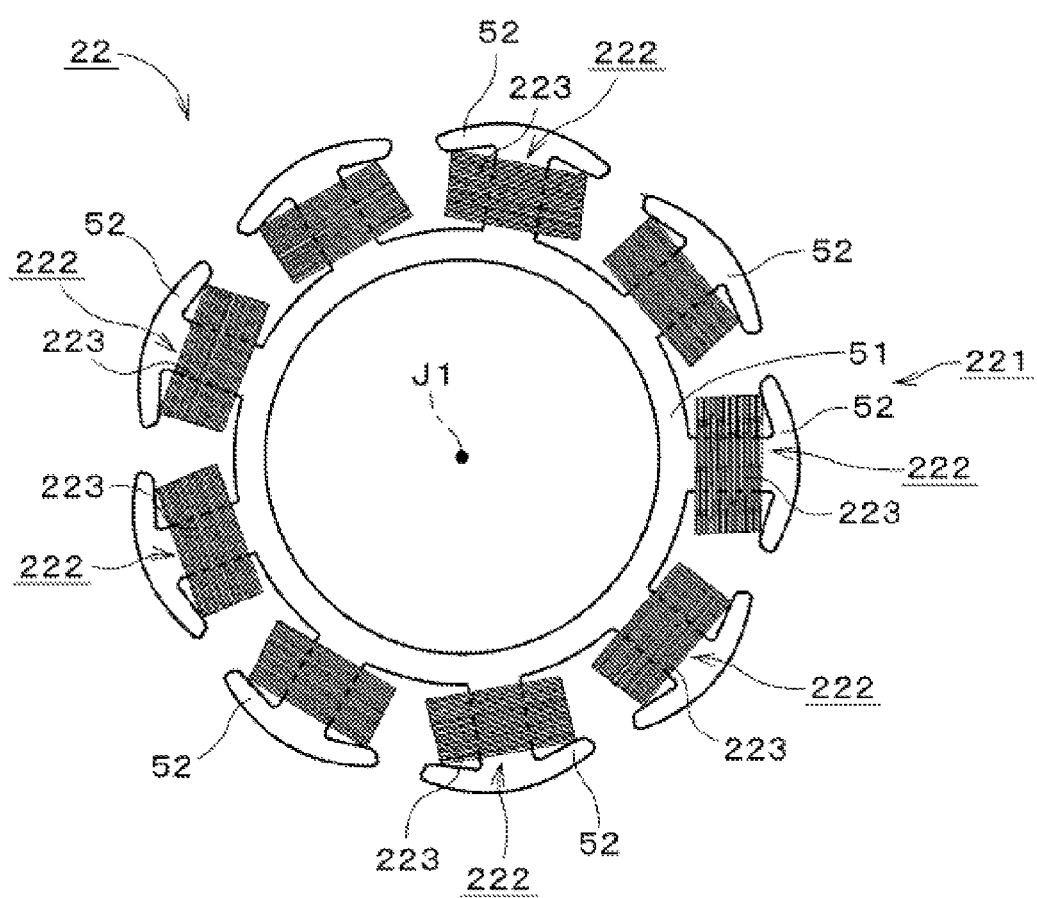
FIG. 3 is a plan view illustrating a stator according to a preferred embodiment of the present invention.

FIG. 3 is a plan view illustrating the stator 22. The stator 22 includes the stator core 221 and the plurality of coils 222. The plurality of coils 222 is preferably mounted on the stator core 221 by, for example, concentrated winding. The stator core 221 includes a central portion 51 that has a circular or approximately circular shape with reference to the central axis J1, and a plurality of teeth 52. The number of the teeth 52 is preferably nine, for example. Each tooth 52 having an approximate T shape extends outward from the outer circumference of the central portion 51 in the radial direction, and also extends toward opposite sides in the circumferential direction at an end portion of the outside. The conducting wire 223 is wound on each tooth 52, and thus, the coil 222 is provided.

The inner diameter of the stator core 221, that is, the inner diameter of the central portion 51 is preferably about 8 mm or more and about 9 mm or less, for example. The number of turns of each coil 222 is preferably about 40 or more and about 80 or less, for example. The number of layers of the conducting wire 223 in each coil 222 is preferably four, for example. In other words, in an upper portion and a lower portion of the tooth 52, the conducting wire 223 is respectively stacked into four layers. The diameter of the conducting wire 223 is preferably about 0.10 mm or more and about 0.15 mm or less, for example.

Figure 4:
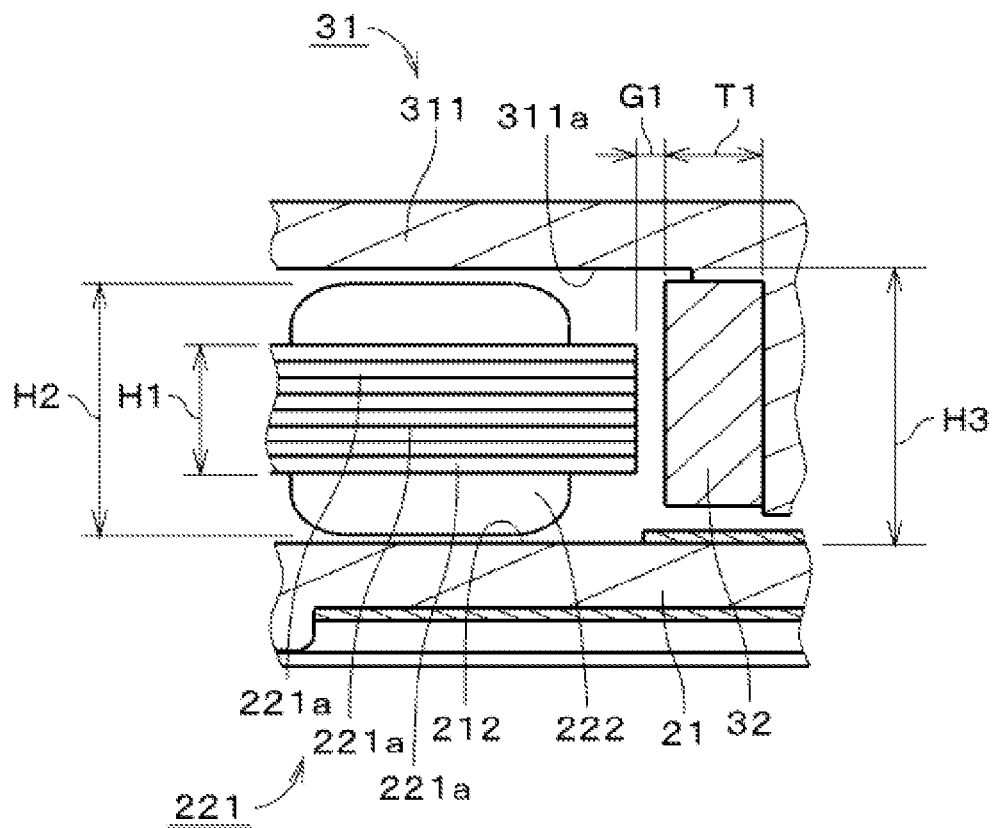
FIG. 4 is an enlarged view of a portion of a spindle motor according to a preferred embodiment of the present invention.

FIG. 4 is an enlarged view of the vicinity of the rotor magnet 32 in FIG. 2. The coil 222 is preferably disposed between the lower surface 311a of the cover portion 311 of the rotor hub 31 and the upper surface 212 of the base plate 21. A distance H3 in the axial direction between the lower surface 311a of the cover portion 311 of the rotor hub 31 and the upper surface 212 of the base plate 21 is approximately 4.0 mm, for example. Hereinafter, the distance H3 is referred to as an "inner height H3".

The stator core 221 is preferably obtained by stacking a plurality of magnetic steel plates 221a. The thickness of one magnetic steel plate 221a is preferably approximately 0.2 mm, for example. The number of the magnetic steel plates 221a is preferably eight to twelve, for example. In the present preferred embodiment, the number of the magnetic steel plates 221a is preferably eight, for example. In the axial direction, a height H1 of the stator core 221 is preferably approximately 1.6 mm, for example. The height H1 does not include the thicknesses of insulating films provided on an upper surface and a lower surface of the stator core 221. In other words, the height H1 is a height from a lower end of the plurality of stacked magnetic steel plates 221a to an upper end thereof. The height H1 of the stator core 221 is preferably about 50% or more and about 70% or less than a height H2 of the stator 22 in the axial direction. The height H2 is a height from a lower end to an upper end of the coil 222. In the present preferred embodiment, the height H2 of the stator 22 is preferably approximately 3.78 mm, for example.

Figure 5:
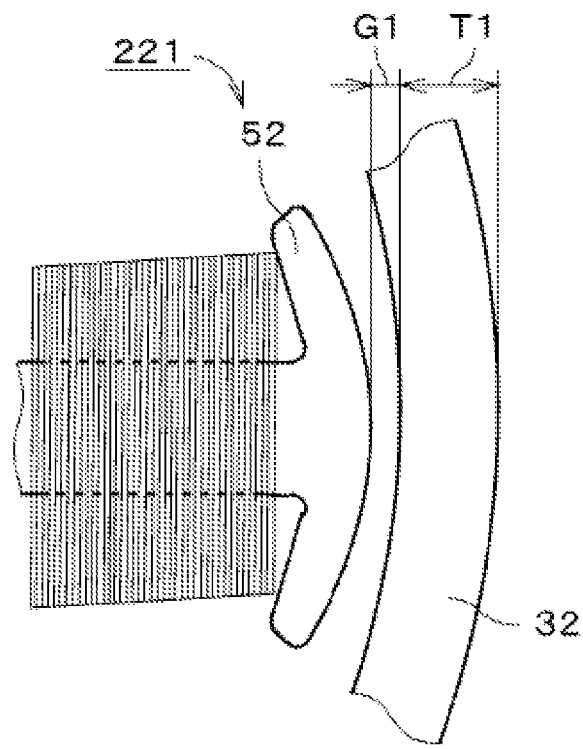
FIG. 5 is an enlarged view of a portion of a spindle motor according to a preferred embodiment of the present invention.

FIG. 5 is an enlarged view illustrating the vicinity of a tip end of the tooth 52 in FIG. 3. A thickness T1 of the rotor magnet 32 shown in FIGS. 4 and 5 in the radial direction is preferably about 0.7 mm or more and about 1.0 mm or less, for example. The thickness T1 does not include the height of an insulating film provided on a front surface of the rotor magnet 32.

The distance G1 in the radial direction between the rotor magnet 32 and the stator core 221 (hereinafter, referred to as an "air gap") is preferably about 0.15 mm or more and about 0.20 mm or less, for example. The air gap G1 is the shortest distance in the radial direction between an outer circumferential surface of the tooth 52 and an inner circumferential surface of the rotor magnet 32. The outer circumferential surface of the tooth 52 refers to an outer surface of the plurality of stacked magnetic steel plates 221a in FIG. 4. In a case where an insulating film is provided on the outer surface of the magnetic steel plate 221a, the thickness of the insulating film is included in the air gap G1. The inner circumferential surface of the rotor magnet 32 refers to an inner circumferential surface of the insulating film provided on the front surface of the rotor magnet 32. The thickness of the insulating film of the rotor magnet 32 is not included in the air gap G1.

In the disk drive apparatus having the thickness of about 7 mm, even though a motor mounted in a disk drive apparatus having the thickness of about 9.5 mm is made thin according to the thickness of about 7 mm, it is difficult to secure sufficient torque constant Kt. For example, in a case where the height of the motor mounted in the disk drive having the thickness of about 9.5 mm is simply reduced by about 26%, the torque constant Kt decreases by half. By reducing the diameter of the conducting wire 223 to increase the number of turns of the coil 222, it is possible to secure the torque constant Kt while making the motor thin, but in this case, the conducting wire resistance value R of the coil 222 increases. The motor in which the conducting wire resistance value R of the coil 222 is large has a small electric current at the time of startup in a case where the motor is driven with the same electric current, compared with a motor having a small conducting wire resistance R. As a result, torque when the motor starts up decreases, and thus, a startup time that is a time until the number of rotations of the motor reaches a rated speed increases. In the motor for the disk drive apparatus, it is preferable to secure sufficient torque and to set the startup time to a predetermined time or less.

Thus, in the motor 12 of the disk drive apparatus 1 having the thickness of about 7 mm, it is preferable to design the motor to generate sufficient torque and to shorten the startup time even with such a limited space. That is, it is preferable to design the motor to simultaneously increase the torque constant Kt and the motor constant Km in a desired range, instead of increasing only the torque constant Kt. As described above, Km is a numerical value defined as Kt/√(R). That is, instead of Kt/R or Kt/R², Km is an optimal index that expresses a suitable motor structure in a case where the motor is made thin. Specifically, in the motor 12, in order to generate sufficient torque, the torque constant Kt is preferably designed to be about 4 mN·m/A or more and 6 about mN·m/A or less, for example. Further, in order to shorten the startup time, the motor is preferably designed so that the motor constant Km is about 2 mN·m/(A·√Ω) or more and about 4 mN·m/(A·Ω) or less, for example.

However, in order to generate sufficient torque in the limited space, it may be considered that the density of magnetic flux generated between the rotor magnet and the stator core is increased. However, if the thickness of the rotor magnet in the radial direction is simply increased in order to increase the magnetic flux density, the motor becomes larger in the radial direction. Further, if the magnetic flux density generated between the rotor magnet and the stator core is excessively increased, vibration or noise is generated. In order to prevent the generation of vibration or noise, it is preferable to increase the air gap in association with the increase in the thickness of the rotor magnet in the radial direction, and thus, the motor further becomes larger in the radial direction.

In the motor mounted in the disk drive apparatus having the thickness of about 9.5 mm, generally, the thickness T1 of the rotor magnet in the radial direction is larger than about 0.93 mm and is equal to or less than about 1.04 mm, for example. Further, the air gap G1 is larger than about 0.2 mm and is equal to or less than about 0.3 mm, for example.

On the other hand, in the motor 12, as described above, the thickness T1 of the rotor magnet 32 in the radial direction preferably is about 0.7 mm or more and about 1.0 mm or less, and the air gap G1 preferably is about 0.15 mm or more and about 0.20 mm or less, for example. In the motor 12, compared with the motor of the disk drive apparatus having the thickness of about 9.5 mm, it is possible to prevent the increase in the radial direction in the limited space, and to increase the density of the magnetic flux generated between the rotor magnet 32 and the stator core 221. Consequently, it is possible to generate sufficient torque when the motor 12 is rotated in the limited space, and to shorten the startup time of the motor 12.

Figure 6:
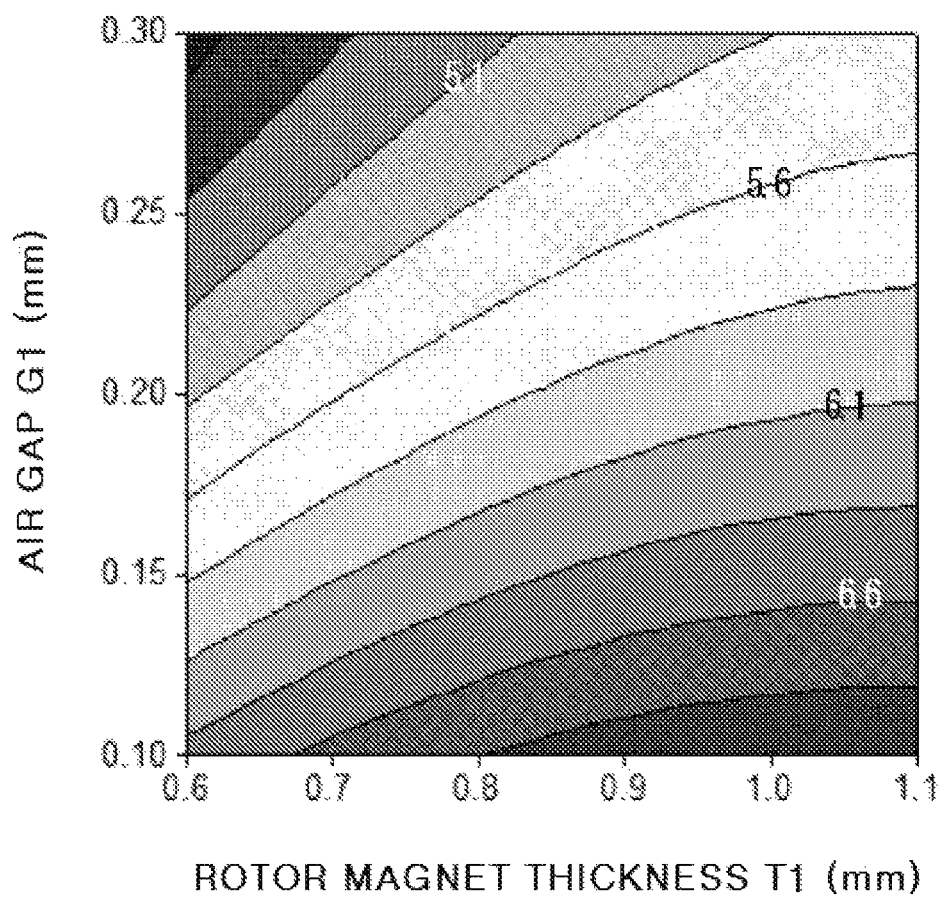
FIG. 6 is a diagram illustrating the relationship between the thickness of a rotor magnet and an air gap and a torque constant according to a preferred embodiment of the present invention.

FIG. 6 is a contour diagram illustrating the relationship between the thickness T1 of the rotor magnet 32 of the motor 12 shown in FIG. 4 and the air gap G1, and the torque constant Kt. A plurality of curves in the figure represents contours of the torque constant Kt, and numerical values in the figure represent values of the torque constant Kt indicated by the contours. The torque constant Kt increases from the upper left to the lower right in FIG. 6. The contours of the torque constant Kt are calculated by simulation while maintaining the outer diameter of the rotor magnet 32 constant and changing the thickness T1 of the rotor magnet 32 and the air gap G1. In the simulation, the number of turns of the coil 222 is also changed according to the change in the thickness T1 of the rotor magnet 32 and the air gap G1. For example, if the thickness T1 of the rotor magnet 32 is constant and the air gap G1 is increased, the outer diameter of the stator core 221 is decreased, and thus, the number of turns of the coil 222 is reduced. Further, similarly, in a case where the air gap G1 is constant and the thickness T1 of the rotor magnet 32 is increased, the outer diameter of the stator core 221 is decreased, and thus, the number of turns of the coil 222 is reduced.

According to FIG. 6, if the thickness T1 of the rotor magnet 32 is changed without change in the G1 in a range where the air gap G1 preferably is about 0.15 mm or more and about 0.20 mm or less, the torque constant Kt gradually increases as T1 increases in a range where T1 preferably is equal to or less than about 1.0 mm, for example. On the other hand, in a range where T1 is larger than about 1.0 mm, the torque constant Kt does not remarkably increase even though T1 increases. In other words, the increase ratio of the torque constant Kt to the increase of T1 in a range where T1 is larger than about 1.0 mm is smaller than the increase ratio of the torque constant Kt to the increase of T1 in a range where T1 is equal to or less than about 1.0 mm.

That is, by setting T1 to about 1.0 mm or less, the magnetic flux density increased according to the increase of T1 is effectively used in the increase of the torque constant Kt. Further, if T1 is smaller than about 0.7 mm, the reduction ratio of Kt to the decrease of T1 is relatively increased. Accordingly, by setting T1 to about 0.7 mm or more and about 1.0 mm or less, it is possible to prevent the rotor magnet 32 from being increased in thickness and to efficiently increase the torque constant Kt.

Figure 7:
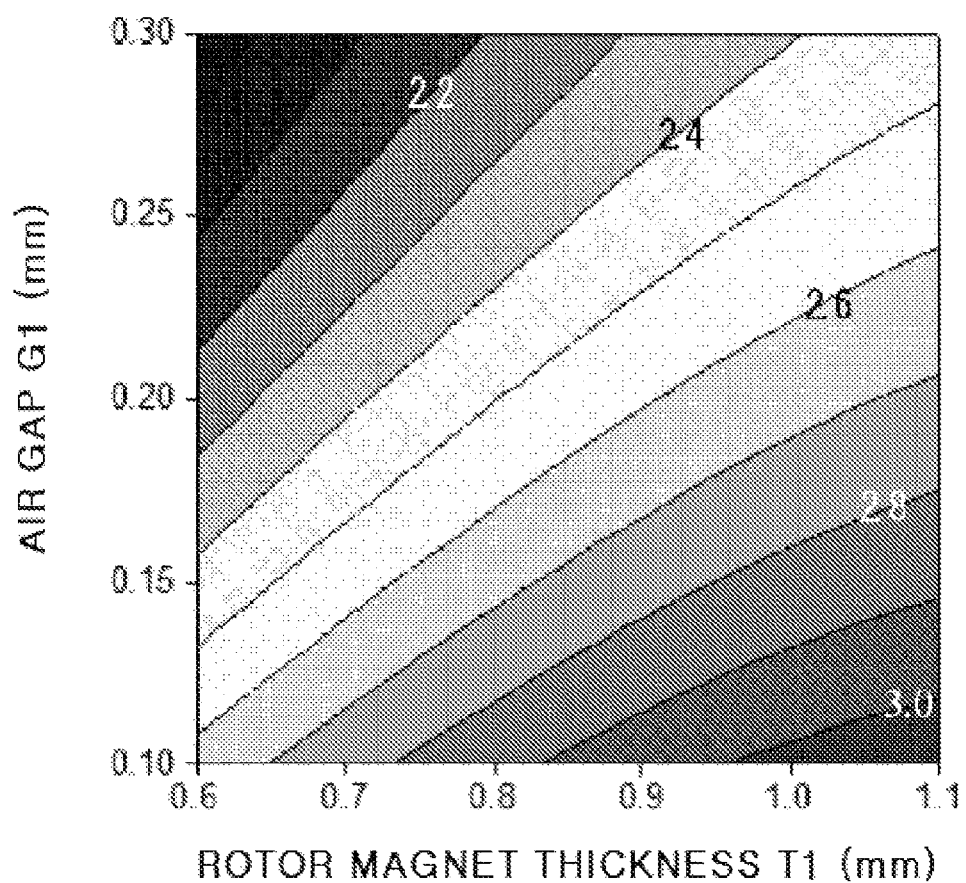
FIG. 7 is a diagram illustrating the relationship between the thickness of a rotor magnet and an air gap and a motor constant according to a preferred embodiment of the present invention.

FIG. 7 is a contour diagram illustrating the relationship between the thickness T1 of the rotor magnet 32 of the motor 12 shown in FIG. 4 and the air gap G1, and the motor constant Km. A plurality of curves in the figure represents contours of the motor constant Km, and numerical values in the figure represent values of the motor constant Km indicated by the contours. The motor constant Km increases from the upper left to the lower right in FIG. 7. The contours of the motor constant Km are calculated by the same method as in the contours of the torque constant Kt. Referring to FIG. 7, if T1 is changed without change in G1 in a range where G1 preferably is about 0.15 mm or more and about 0.20 mm or less, the motor constant Km gradually increases as T1 increases in a range where T1 preferably is about 0.7 mm or more and about 1.0 mm or less, for example. That is, the magnetic flux density increased according to the increase of T1 is effectively used in the increase of the motor constant Km.

As described above, in the motor 12 shown in FIG. 4, the thickness T1 of the rotor magnet 32 preferably is about 0.7 mm or more and about 1.0 mm or less, and the air gap G1 preferably is about 0.15 mm or more and about 0.20 mm or less, for example. In this way, by decreasing T1 and G1, it is possible to prevent the motor 12 from being enlarged in the radial direction, and to increase the outer diameter of the stator core 221. Thus, in the motor 12 in which the inner height H3 is relatively small, it is possible to increase the upper limit of the number of turns of the coil 222. Consequently, it is possible to easily realize the torque constant Kt and the motor constant Km of a desired size.

In the motor 12, by setting the torque constant Kt to about 4 mN·m/A or more and about 6 mN·m/A or less, for example, it is possible to efficiently generate sufficient torque while suppressing the amount of electric current. Further, by setting the motor constant Km to about 2 mN·m/(A·√Ω) or more and about 4 mN·m/(A·√Ω) or less, for example, it is possible to shorten the startup time of the motor 12.

FIGS. 8 to 11 respectively show results obtained by calculating the core height ratio Hr, the motor constant Km, the torque constant Kt, and the number of layers of the conducting wire 223 while variously changing the height H1 of the stator core 221 and the diameter D1 of the conducting wire 223 in a case where the inner height H3 of the motor 12 shown in FIG. 4 is about 4.0 mm, for example. The core height ratio Hr represents the ratio of the height H1 of the stator core 221 to the height H2 of the stator 22. The height H2 of the stator 22 corresponds to the height thereof in a case where the conducting wire 223 is wound to the maximum in the inner space of the inner height H3. Further, the number of layers of the conducting wire 223 represents the number of layers in a case where the conducting wire 223 is wound to the maximum in the inner space of the inner height H3. The motor constant Km and the torque constant Kt are calculated by simulation. This is similarly applied to FIGS. 12 to 19 and FIGS. 25 to 28.

Figure 8:
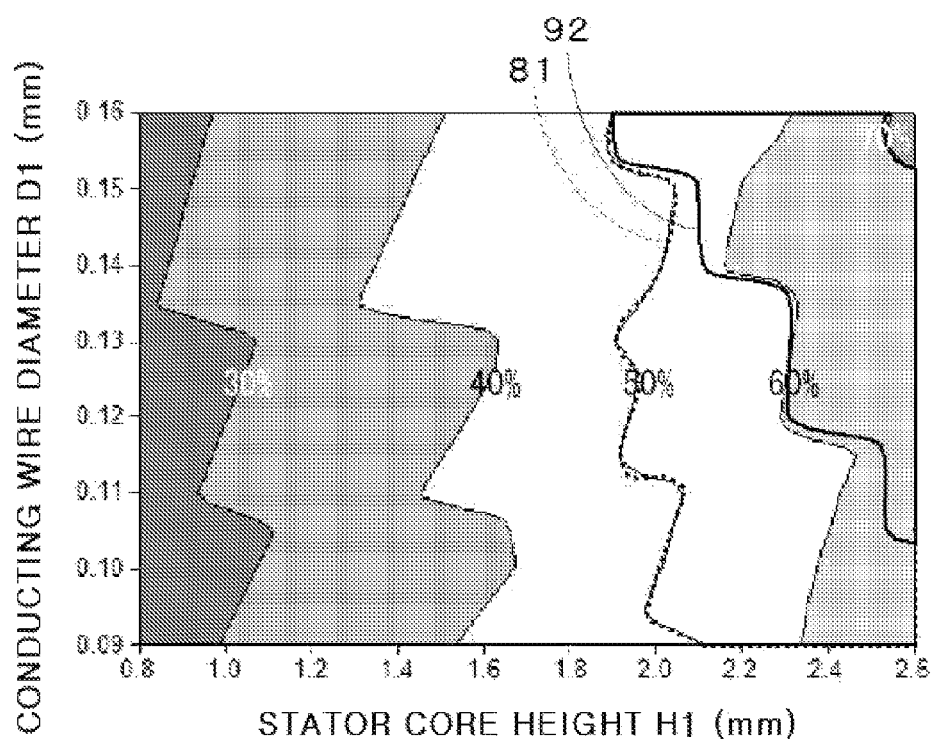
FIG. 8 is a diagram illustrating the relationship between the height of a stator core and the diameter of a conducting wire and a core height ratio according to a preferred embodiment of the present invention.

FIG. 8 is a contour diagram illustrating the relationship between the height H1 of the stator core 221 of the motor 12 shown in FIG. 4 and the diameter D1 of the conducting wire 223, and the core height ratio Hr. A plurality of curves in the figure represents contours of the core height ratio Hr, and numerical values in the figure represent values of the core height ratio Hr indicated by the contours. This is similarly applied to FIGS. 12, 16 and 25. The core height ratio Hr increases from the left to the right in FIG. 8. In FIG. 8, a region where the core height ratio Hr is about 50% or more and about 70% or less is surrounded by a thick broken line with reference numeral 81.

Figure 9:
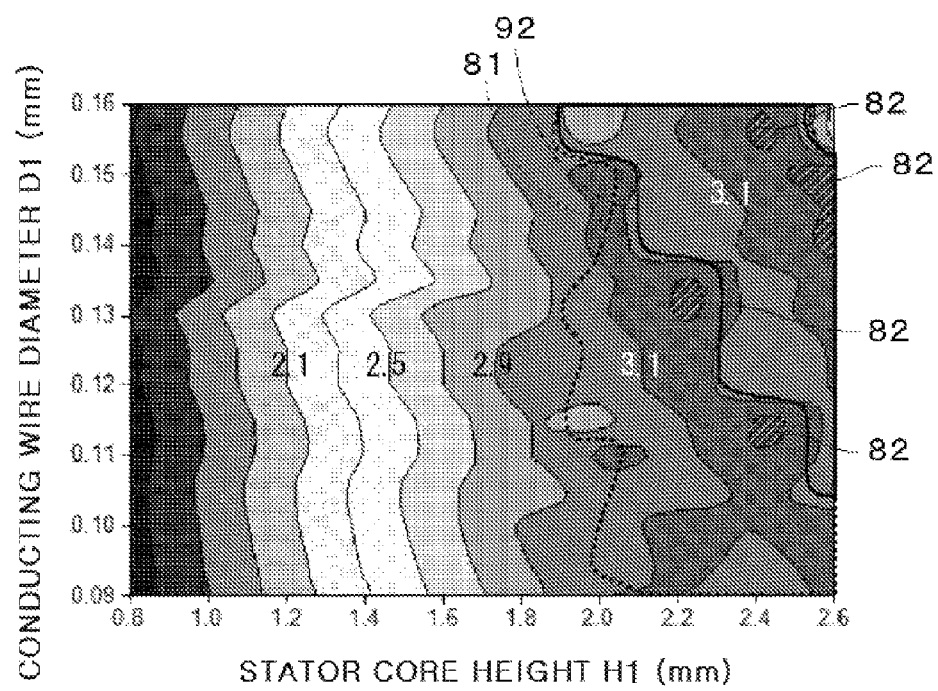
FIG. 9 is a diagram illustrating the relationship between the height of a stator core and the diameter of a conducting wire and a motor constant according to a preferred embodiment of the present invention.

FIG. 9 is a contour diagram illustrating the relationship between the height H1 of the stator core 221 of the motor 12 shown in FIG. 4 and the diameter D1 of the conducting wire 223, and the motor constant Km. A plurality of curves in the figure represents contours of the motor constant Km, and numerical values in the figure represent values of the motor constant Km indicated by the contours. This is similarly applied to FIGS. 13, 17 and 26. Regions 82 indicated by parallel slanted lines in FIG. 9 represent regions in which the motor constant Km is the maximum. The motor constant Km is small on the left side in FIG. 9, gradually increases from the lower left to the upper right, and becomes a peak in a range where H1 is about 2.2 mm or more and about 2.5 mm or less. Further, if the motor constant Km passes the peak, the motor constant Km decreases once toward the upper right, and then increases again. A region surrounded by the thick broken line with reference numeral 81 represents a region where the core height ratio Hr is about 50% or more and about 70% or less, in a similar way to FIG. 8, and includes the regions 82 where the motor constant Km is the maximum in FIG. 9. In this way, by setting the core height ratio Hr to about 50% or more and about 70% or less, it is possible to efficiently increase the motor constant Km.

Figure 10:
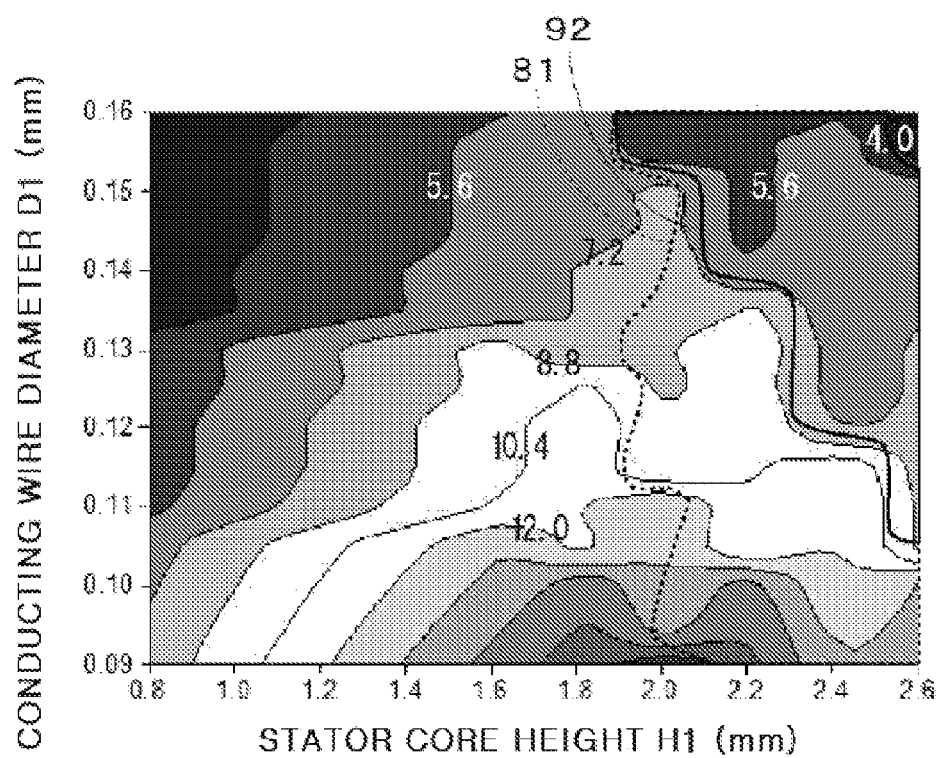
FIG. 10 is a diagram illustrating the relationship between the height of a stator core and the diameter of a conducting wire and a torque constant according to a preferred embodiment of the present invention.

FIG. 10 is a contour diagram illustrating the relationship between the height H1 of the stator core 221 of the motor 12 shown in FIG. 4 and the diameter D1 of the conducting wire 223, and the torque constant Kt. A plurality of curves in the figure represents contours of the torque constant Kt, and numerical values in the figure represent values of the torque constant Kt indicated by the contours. This is similarly applied to FIGS. 14, 18 and 27. The torque constant Kt increases from the upper side to the lower side in FIG. 10. A region surrounded by the thick broken line with reference numeral 81 represents a region where the core height ratio Hr is about 50% or more and about 70% or less, in a similar way to FIG. 8. The region surrounded by the thick broken line 81 includes a region where the torque constant Kt is about 4 mN·m/A or more and about 6 mN·m/A or less.

As described above, the core height ratio Hr is the ratio of the height H1 of the stator core 221 to the height H2 of the stator 22 in a case where the conducting wire 223 is wound to the maximum in the inner space of the inner height H3. If the height H1 of the stator core 221 and the diameter D1 of the conducting wire 223 are changed, the number of layers of the conducting wire 223 in the coil 222 is also changed. Specifically, if the diameter D1 of the conducting wire 223 is constant and the height H1 of the stator core 221 increases, the core height ratio Hr increases, and the number of layers of the conducting wire 223 decreases. Further, if the height H1 of the stator core 221 is constant and the diameter D1 of the conducting wire 223 increases, the number of layers of the conducting wire 223 decreases. Since the number of layers of the conducting wire 223 is an even number, the minimum value of the number of layers is 2.

Figure 11:
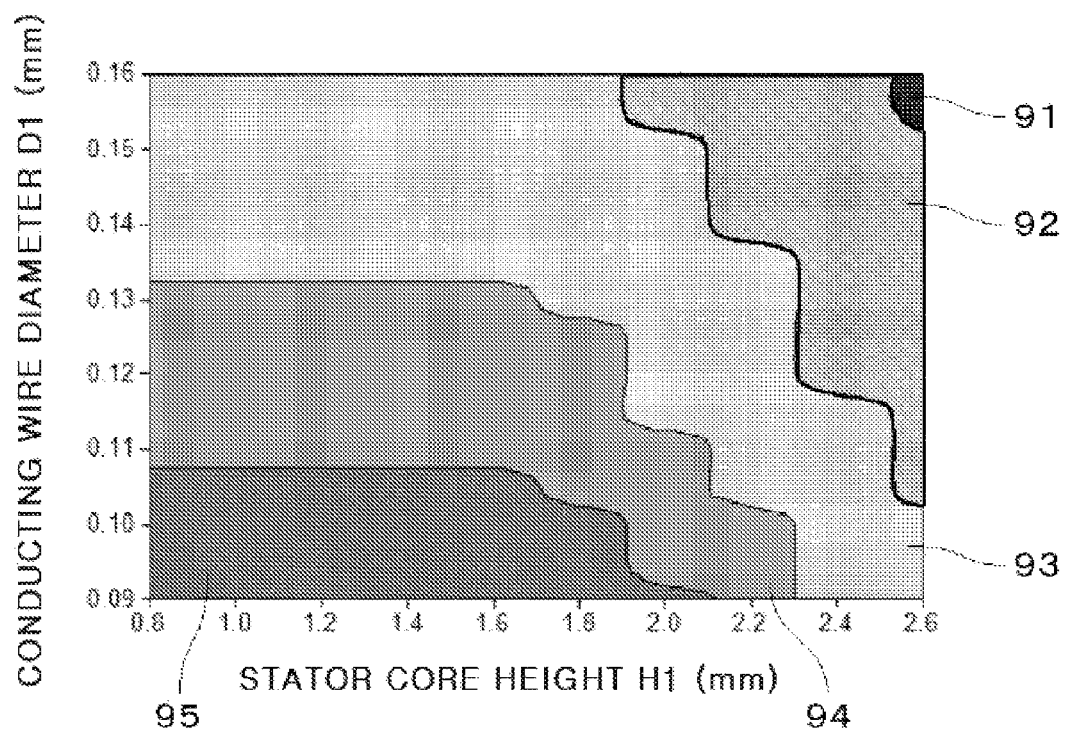
FIG. 11 is a diagram illustrating the relationship between the height of a stator core and the diameter of a conducting wire and the number of layers of the conducting wire according to a preferred embodiment of the present invention.

FIG. 11 is a diagram illustrating the relationship between the height H1 of the stator core 221 of the motor 12 shown in FIG. 4 and the diameter D1 of the conducting wire 223, and the number of layers of the conducting wire 223. Regions 91 to 95 that are arranged from the upper right to the lower left in FIG. 11 respectively represent regions where the number of layers of the conducting wire 223 is two, four, six, eight, and ten. In FIGS. 8 to 10, the region 92 in which the number of layers of the conducting wire 223 is four is indicated by a thick solid line. As shown in FIG. 8, in a case where the number of layers of the conducting wire 223 is four, the core height ratio Hr is about 50% or more and about 70% or less. As shown in FIGS. 9 and 10, the region 92 includes the regions 82 in which the motor constant Km is the maximum in the figure, and includes a region where the torque constant Kt is about 4 mN·m/A or more and about 6 mN·m/A or less.

FIGS. 12 to 15 respectively show results obtained by calculating the core height ratio Hr, the motor constant Km, the torque constant Kt, and the number of layers of the conducting wire 223 while variously changing the height H1 of the stator core 221 and the diameter D1 of the conducting wire 223 in a case where the inner height H3 of the motor 12 shown in FIG. 4 is about 3.5 mm.

Figure 12:
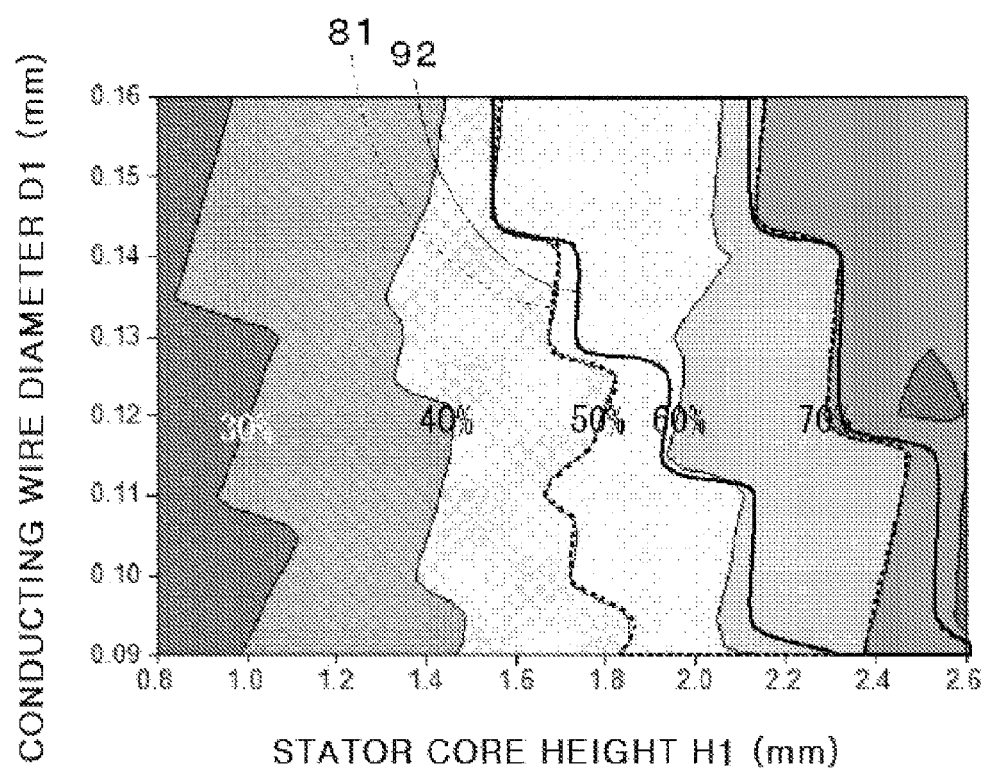
FIG. 12 is a diagram illustrating the relationship between the height of a stator core and the diameter of a conducting wire and a core height ratio according to a preferred embodiment of the present invention.

FIG. 12 is a contour diagram illustrating the relationship between the height H1 of the stator core 221 of the motor 12 shown in FIG. 4 and the diameter D1 of the conducting wire 223, and the core height ratio Hr. In FIG. 12, in a similar way to FIG. 8, a region where the core height ratio Hr is about 50% or more and about 70% or less is surrounded by a thick broken line with reference numeral 81.

Figure 13:
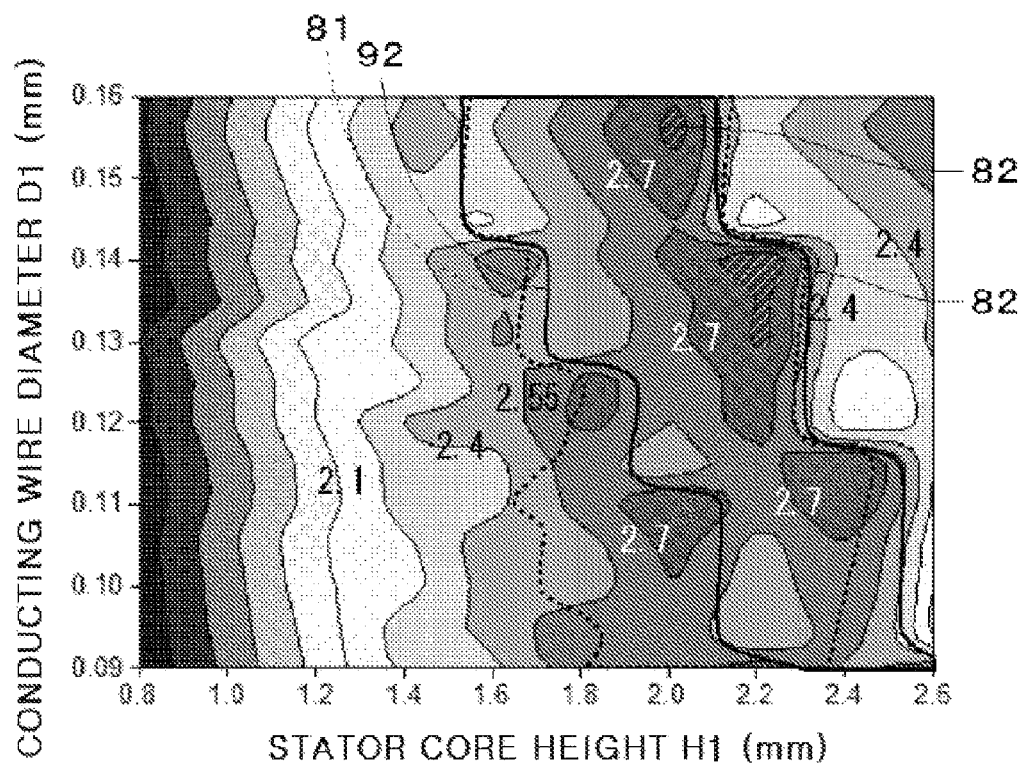
FIG. 13 is a diagram illustrating the relationship between the height of a stator core and the diameter of a conducting wire and a motor constant according to a preferred embodiment of the present invention.

FIG. 13 is a contour diagram illustrating the relationship between the height H1 of the stator core 221 of the motor 12 shown in FIG. 4 and the diameter D1 of the conducting wire 223, and the motor constant Km. Regions 82 indicated by parallel slanted lines represent regions where the motor constant Km is the maximum in FIG. 13. The motor constant Km is small on the left side in FIG. 13, gradually increases from the lower left to the upper right, and becomes a peak in a range where H1 is about 2.0 mm or more and about 2.3 mm or less. Further, if the motor constant Km passes the peak, the motor constant Km decreases once toward the upper right, and then increases again. A region surrounded by a thick broken line with reference numeral 81 is a region where the core height ratio Hr is about 50% or more and about 70% or less, in a similar way to FIG. 12, and includes the regions 82 where the motor constant Km in FIG. 13 is the maximum. In this way, by setting the core height ratio Hr to about 50% or more and about 70% or less, it is possible to efficiently increase the motor constant Km.

Figure 14:
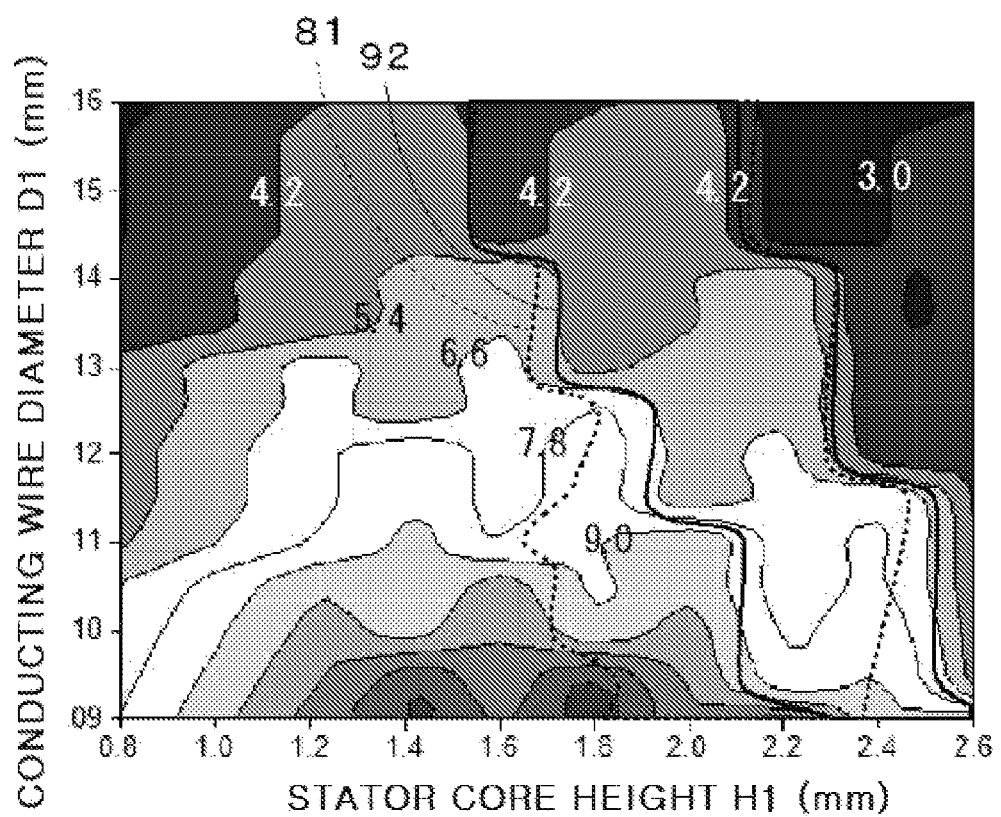
FIG. 14 is a diagram illustrating the relationship between the height of a stator core and the diameter of a conducting wire and a torque constant according to a preferred embodiment of the present invention.

FIG. 14 is a contour diagram illustrating the relationship between the height H1 of the stator core 221 of the motor 12 shown in FIG. 4 and the diameter D1 of the conducting wire 223, and the torque constant Kt. The torque constant Kt increases from the upper side to the lower side in FIG. 14. A region surrounded by a thick broken line with reference numeral 81 represents a region where the core height ratio Hr is about 50% or more and about 70% or less, in a similar way to FIG. 12. A region surrounded by the thick broken line 81 includes a region where the torque constant Kt is about 4 mN·m/A or more and about 6 mN·m/A or less.

Figure 15:
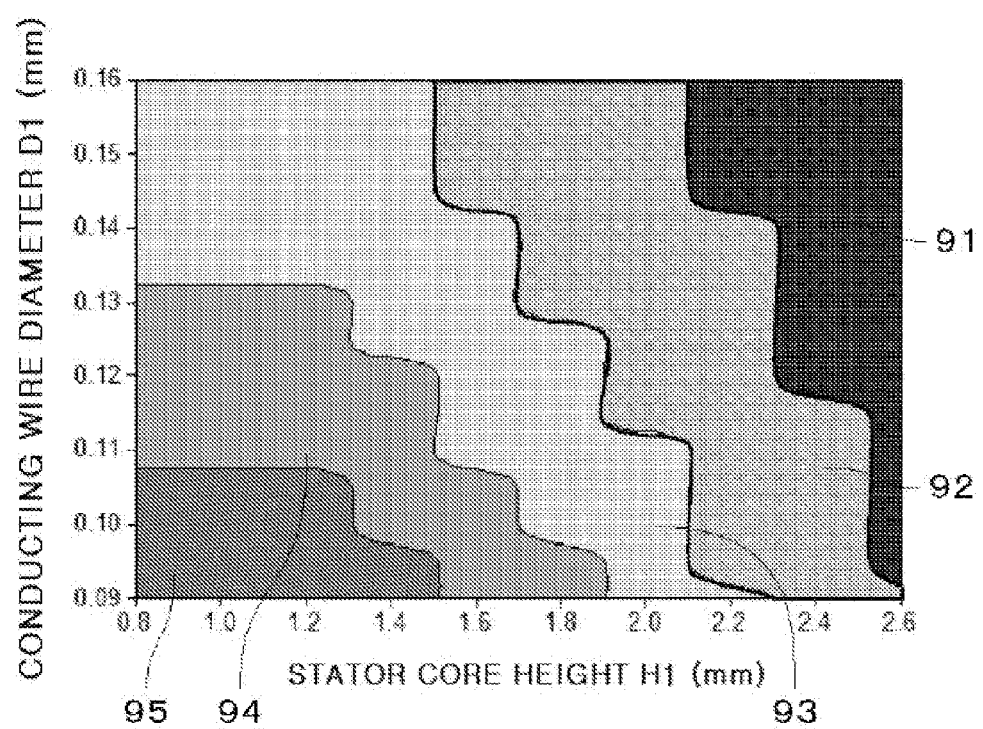
FIG. 15 is a diagram illustrating the relationship between the height of a stator core and the diameter of a conducting wire and the number of layers of the conducting wire according to a preferred embodiment of the present invention.

FIG. 15 is a diagram illustrating the relationship between the height H1 of the stator core 221 of the motor 12 shown in FIG. 4 and the diameter D1 of the conducting wire 223, and the number of layers of the conducting wire 223. Regions 91 to 95 that are arranged from the upper right to the lower left in FIG. 15 respectively represent regions where the number of layers of the conducting wire 223 is two, four, six, eight, and ten. In FIGS. 12 to 14, the region 92 in which the number of layers of the conducting wire 223 is four is indicated by a thick solid line. As shown in FIG. 12, in a case where the number of layers of the conducting wire 223 is 4, the core height ratio Hr is about 50% or more and about 70% or less. As shown in FIGS. 13 and 14, a region where the region 92 and the region 81 where the core height ratio Hr is about 50% or more and about 70% or less are overlapped includes the regions 82 where the motor constant Km is the maximum, and includes the region where the torque constant Kt is about 4 mN·m/A or more and about 6 mN·m/A or less.

FIGS. 16 to 19 respectively show results obtained by calculating the core height ratio Hr, the motor constant Km, the torque constant Kt, and the number of layers of the conducting wire 223 while variously changing the height H1 of the stator core 221 and the diameter D1 of the conducting wire 223 in a case where the inner height H3 of the motor 12 shown in FIG. 4 is about 3.0 mm.

Figure 16:
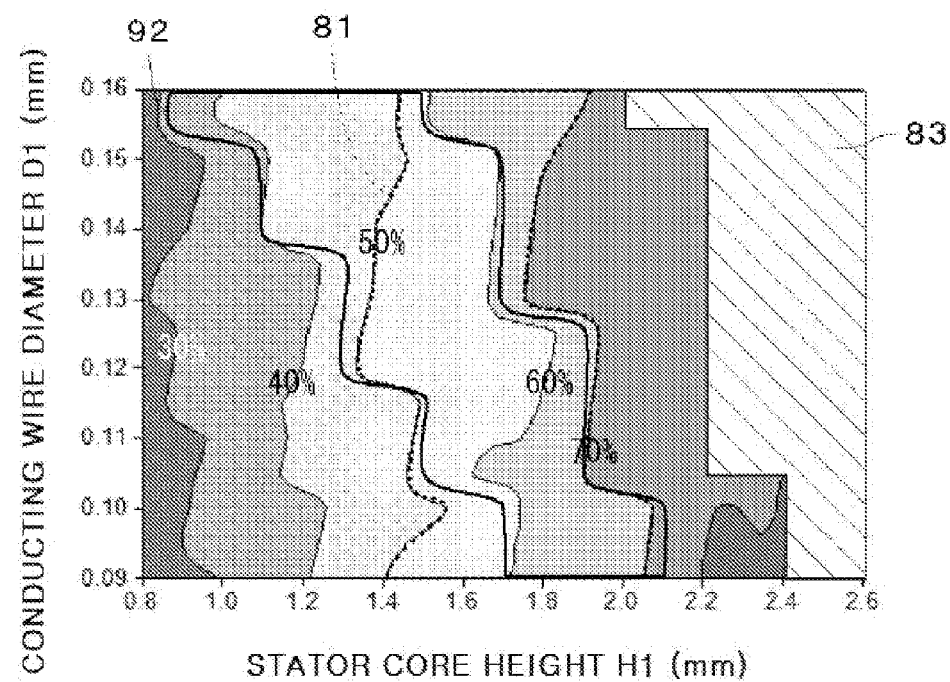
FIG. 16 is a diagram illustrating the relationship between the height of a stator core and the diameter of a conducting wire and a core height ratio according to a preferred embodiment of the present invention.

FIG. 16 is a contour diagram illustrating the relationship between the height H1 of the stator core 221 of the motor 12 shown in FIG. 4 and the diameter D1 of the conducting wire 223, and the core height ratio Hr. In FIG. 16, in a similar way to FIG. 8, a region where the core height ratio Hr is about 50% or more and about 70% or less is surrounded by a thick broken line with reference numeral 81. A region 83 indicated by parallel slanted lines on the right side in FIG. 16 represents a region where the coil 222 cannot be provided due to the relationship between the inner height H3, the height H1 of the stator core 221 and the diameter D1 of the conducting wire 223. This is similarly applied to a region 83 in FIGS. 17 to 19.

Figure 17:
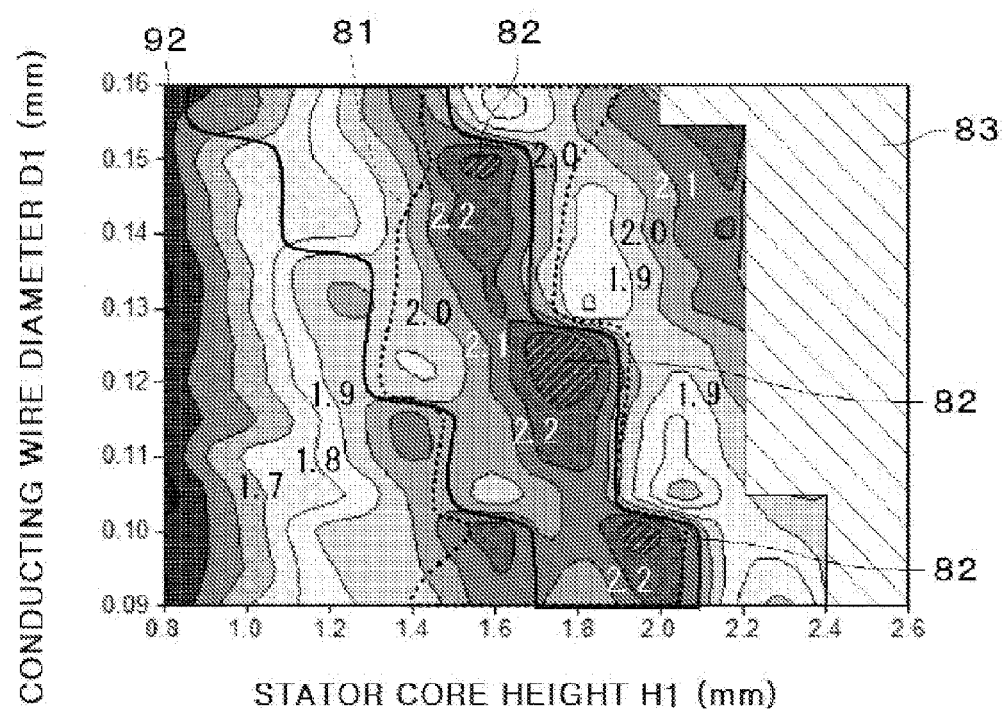
FIG. 17 is a diagram illustrating the relationship between the height of a stator core and the diameter of a conducting wire and a motor constant according to a preferred embodiment of the present invention.

FIG. 17 is a contour diagram illustrating the relationship between the height H1 of the stator core 221 of the motor 12 shown in FIG. 4 and the diameter D1 of the conducting wire 223, and the motor constant Km. Regions 82 indicated by parallel slanted lines represent regions where the motor constant Km is the maximum in FIG. 17. The motor constant Km is small on the left side in FIG. 17, gradually increases from the lower left to the upper right, and becomes a peak in a range where H1 is about 1.5 mm or more and about 2.0 mm or less. Further, if the motor constant Km passes the peak, the motor constant Km decreases once toward the upper right, and then increases again. A region surrounded by a thick broken line with reference numeral 81 represents a region where the core height ratio Hr is about 50% or more and about 70% or less, in a similar way to FIG. 16, and includes the regions 82 where the motor constant Km in FIG. 17 is the maximum. In this way, by setting the core height ratio Hr to about 50% or more and about 70% or less, for example, it is possible to efficiently increase the motor constant Km.

Figure 18:
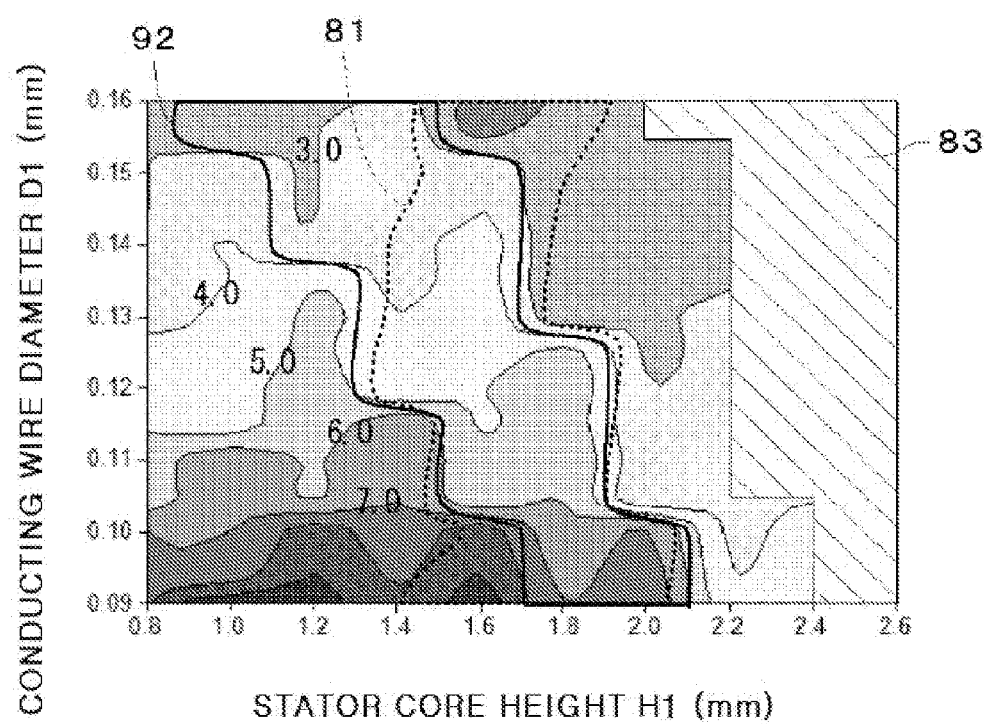
FIG. 18 is a diagram illustrating the relationship between the height of a stator core and the diameter of a conducting wire and a torque constant according to a preferred embodiment of the present invention.

FIG. 18 is a contour diagram illustrating the relationship between the height H1 of the stator core 221 of the motor 12 shown in FIG. 4 and the diameter D1 of the conducting wire 223, and the torque constant Kt. The torque constant Kt increases from the upper side to the lower side in FIG. 18. A region surrounded by a thick broken line with reference numeral 81 represents a region where the core height ratio Hr is about 50% or more and about 70% or less, in a similar way to FIG. 16. The region surrounded by the thick broken line 81 includes a region where the torque constant Kt is about 4 mN·m/A or more and about 6 mN·m/A or less.

Figure 19:
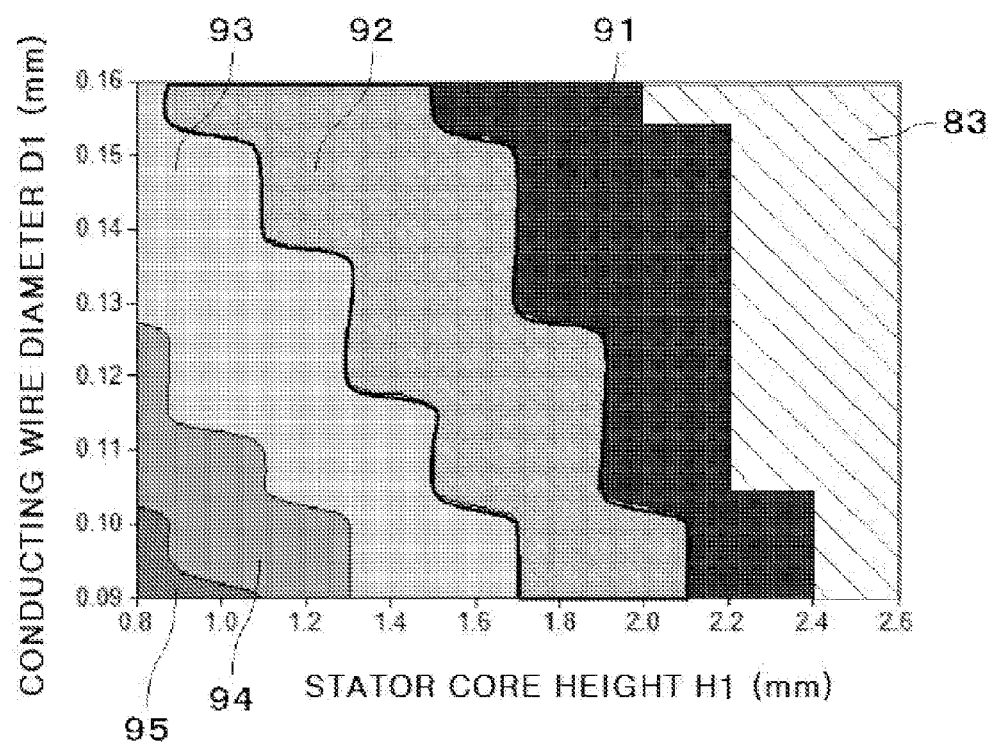
FIG. 19 is a diagram illustrating the relationship between the height of a stator core and the diameter of a conducting wire and the number of layers of the conducting wire according to a preferred embodiment of the present invention.

FIG. 19 is a diagram illustrating the relationship between the height H1 of the stator core 221 of the motor 12 shown in FIG. 4 and the diameter D1 of the conducting wire 223, and the number of layers of the conducting wires 223. Regions 91 to 95 that are arranged from the upper right to the lower left in FIG. 19 respectively represent regions where the number of layers of the conducting wire 223 is two, four, six, eight, and ten. In FIGS. 16 to 18, the region 92 in which the number of layers of the conducting wire 223 is four is indicated by a thick solid line. As shown in FIG. 16, in the region 92 where the number of layers of the conducting wire 223 is 4, the core height ratio Hr is about 50% or more and about 70% or less in a portion of about ⅔ from the right. As shown in FIGS. 17 and 18, a region where the region 92 and the region 81 where the core height ratio Hr is about 50% or more and about 70% or less are overlapped includes the regions 82 where the motor constant Km is the maximum, and includes the region where the torque constant Kt is about 4 mN·m/A or more and about 6 mN·m/A or less.

In the disk drive apparatus 1 having the thickness of 7 mm, the inner height H3 that can be realized is about 3.0 mm or more and about 4.0 mm or less, for example. As shown in FIG. 1, in a case where two disks 11 are fixed to the motor 12, the inner height H3 shown in FIG. 4 is about 4.0 mm as described above, but in a case where one disk 11 is fixed to the motor 12, the inner height H3 may be about 3.0 mm or about 3.5 mm, for example.

As described with reference to FIGS. 8 to 19, by setting the core height ratio Hr of the motor 12 to about 50% or more and about 70% or less, it is possible to efficiently increase the motor constant Km in the range of about 2 mN·m/(A·$\sqrt{\Omega}$) or more and about 4 mN·m/(A·$\sqrt{\Omega}$) or less while setting the torque constant Kt to about 4 mN·m/A or more and about 6 mN·m/A or less, for example.

As described above, in the motor 12, by setting the torque constant Kt to about 4 mN·m/A or more and about 6 mN·m/A or less, for example, it is possible to efficiently generate sufficient torque while suppressing the amount of electric current. Further, by setting the motor constant Km to about 2 mN·m/(A·$\sqrt{\Omega}$) or more and about 4 mN·m/(A·$\sqrt{\Omega}$) or less, for example, it is possible to shorten the startup time of the motor 12. In the motor 12, by setting the number of layers of the conducting wire 223 to four, it is possible to easily set the core height ratio Hr to about 50% or more and about 70% or less, for example. Consequently, it is possible to efficiently generate sufficient torque while suppressing the amount of electric current, and to easily realize the motor 12 in which the startup time is short.

In the motor 12, as described above, the inner diameter of the stator core 221 preferably is about 8 mm or more and about 9 mm or less, for example. By setting the inner diameter of the stator core 221 to about 9 mm or less, for example, it is possible to increase the length of the tooth 52 in the radial direction. Thus, it is possible to increase the upper limit of the number of turns of the coil 222 while preventing an increase of the inner height H3 of the disk drive apparatus 1. Further, by setting the inner diameter of the stator core 221 to about 8 mm or more, for example, it is possible to easily install the stator core 221 to the base plate 21.

In the motor 12, the diameter of the conducting wire 223 preferably is about 0.10 mm or more and about 0.15 mm or less, for example. The number of turns of each coil 222 preferably is about 40 or more and about 80 or less, for example. However, in the disk drive apparatus having the thickness of about 9.5 mm, generally, a conducting wire having a diameter larger than about 0.15 mm is preferably used, for example. The number of turns of the coil preferably is about 40 or more and about 60 or less, for example. In the motor 12, compared with the motor of the disk drive apparatus having the thickness of about 9.5 mm, it is possible to increase the upper limit of the number of turns while suppressing an increase of the resistance value of the coil 222 in the limited space. Accordingly, it is possible to generate sufficient torque when the motor 12 is rotated in the limited space, and to shorten the startup time of the motor 12.

In the stator 22, by setting the number of the magnetic steel plates 221a to eight to twelve, it is possible to easily set the core height ratio Hr to about 50% or more and about 70% or less, for example. By using a magnetic steel plate having a thickness of about 0.2 mm, for example, that is easily available as the magnetic steel plate 221a, it is possible to reduce the manufacturing cost of the stator core 221. In the stator core 221, the magnetic steel plates 221a of various thicknesses and numbers may be used. The thickness of the magnetic steel plate 221a may be about 0.15 mm or about 0.3 mm, for example.

Further, the motor 12 is not only applied to the disk drive apparatus having the width of about 2.5" and the thickness of about 7 mm, but may also be applied to a disk drive apparatus having a width of about 2.5" and a thickness of about 6 mm, a width of about 2.5" and a thickness of about 5 mm, a width of about 2.5" and a thickness of about 4 mm, a width of about 2.5" and a thickness of about 3 mm, or the like, for example.

Figure 20:
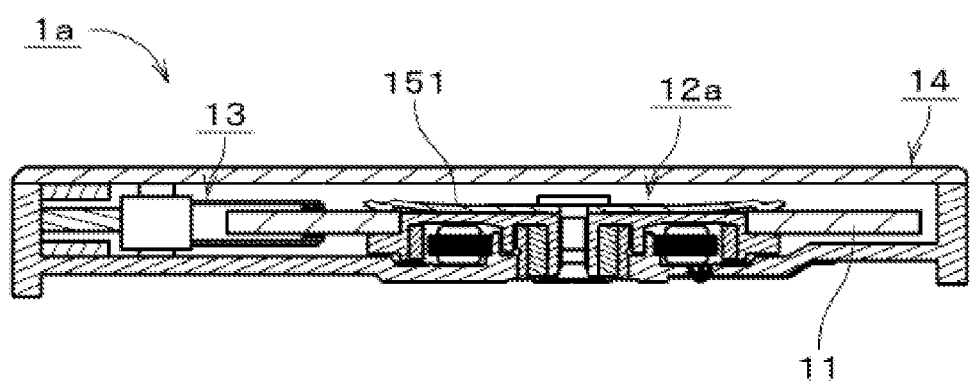
FIG. 20 is a diagram illustrating a disk drive apparatus according to a second preferred embodiment of the present invention.

FIG. 20 is a longitudinal sectional view illustrating a disk drive apparatus 1a including a motor 12a according to a second exemplary preferred embodiment of the invention. The disk drive apparatus 1a is preferably a hard disk drive having a width of about 2.5" and a thickness of about 5 mm. The disk drive apparatus 1a includes the motor 12a that is thinner than the motor 12, instead of the motor 12 shown in FIG. 1. The other configuration is approximately similar to that of the disk drive apparatus 1 shown in FIG. 1, and in the following description, the same reference numerals are given to corresponding components. The motor 12a preferably is a three-phase brushless motor.

The disk drive apparatus 1a preferably includes a disk 11, an access unit 13, a housing 14, and a clamper 151. The disk 11 is clamped to the motor 12a by the clamper 151. The motor 12a rotates the disk 11 that records information. The access unit 13 performs at least one of reading and writing of information with respect to the disk 11. The disk 11, the motor 12a, the access unit 13, and the clamper 151 are accommodated inside the housing 14.

Figure 21:
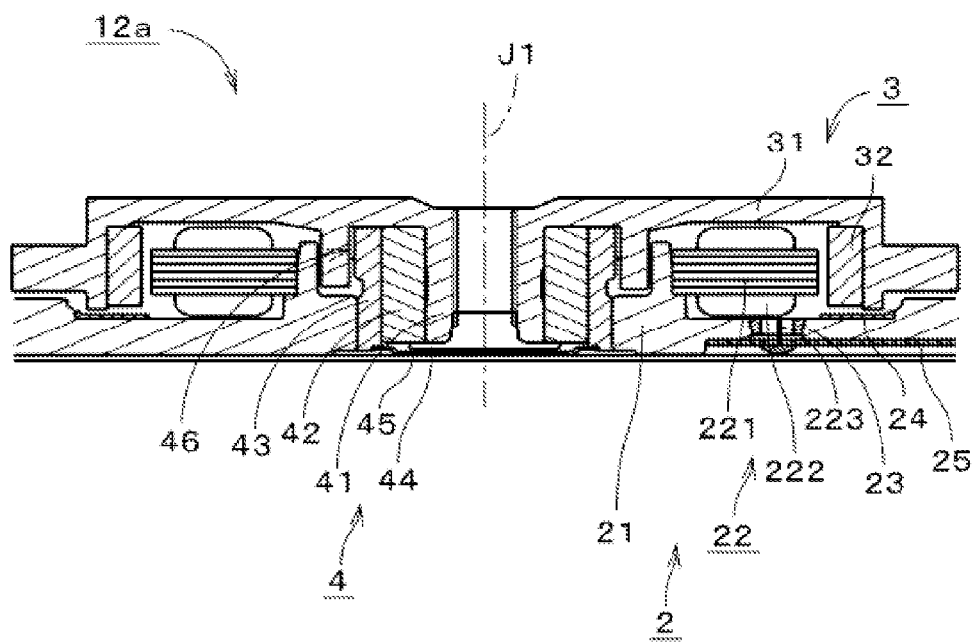
FIG. 21 is a cross-sectional view illustrating a spindle motor according to a preferred embodiment of the present invention.

FIG. 21 is a longitudinal sectional view illustrating the motor 12a. The motor 12a preferably has approximately the same structure as that of the motor 12 shown in FIG. 2, except that the thickness is reduced. The motor 12a includes a stationary portion 2, a rotating portion 3, and a bearing mechanism 4. The stationary portion 2 preferably includes a base plate 21, a stator 22, an insulating bushing 23, a magnetic member 24, and a wiring substrate 25. The stator 22 includes a stator core 221 and a coil 222. The rotating portion 3 includes a rotor hub 31 and a rotor magnet 32. The bearing mechanism 4 preferably includes a shaft portion 41, a sleeve 42, a sleeve housing 43, a thrust plate 44, a cap portion 45, and a lubricant 46.

When the motor 12a is driven, torque is generated between the stator 22 and the rotor magnet 32. A torque constant Kt of the torque generated between the stator 22 and the rotor magnet 32 is preferably about 3 mN·m/A or more and about 4.5 mN·m/A or less, for example. Further, a motor constant Km is preferably about 1 mN·m/(A·√Ω) or more and about 2 mN·m/(A·√Ω) or less, for example.

The inner diameter of the stator core 221 with reference to a central axis J1 is preferably about 8 mm or more and about 9 mm or less, for example. The number of turns of each coil 222 is preferably about 40 or more and about 80 or less, for example. The number of layers of a conducting wire 223 in each coil 222 is preferably four, for example. The diameter of the conducting wire 223 is preferably about 0.10 mm or more and about 0.15 mm or less, for example.

Figure 22:
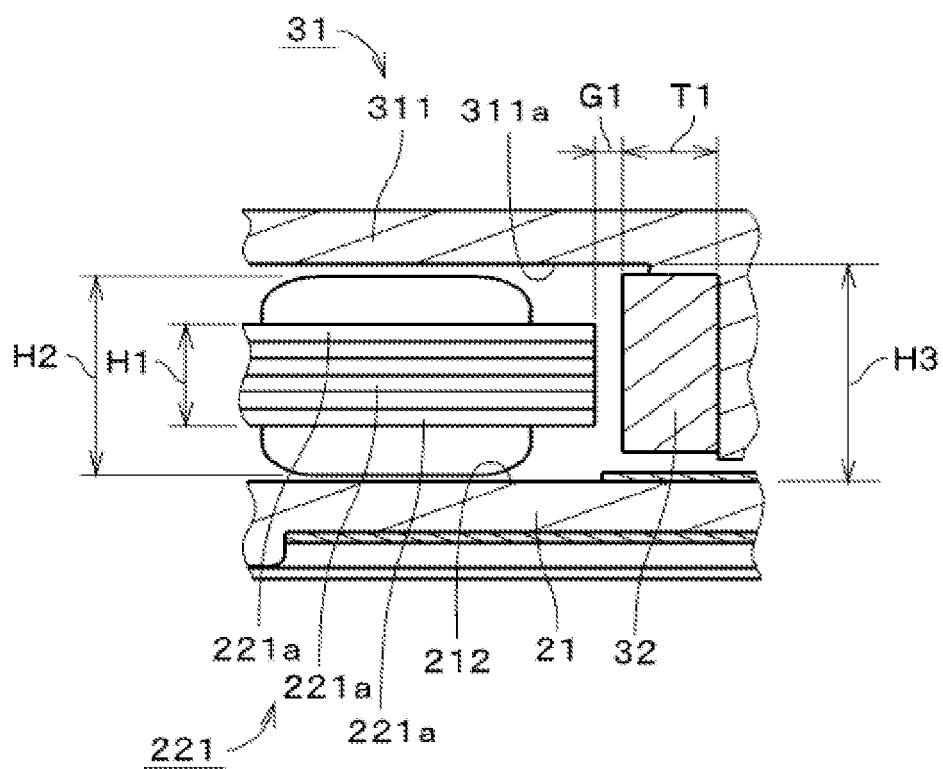
FIG. 22 is an enlarged view of a portion of a spindle motor according to a preferred embodiment of the present invention.

FIG. 22 is an enlarged view of the vicinity of the rotor magnet 32 in FIG. 21. An inner height H3 that is the distance in the axial direction between a lower surface 311a of a cover portion 311 of the rotor hub 31 and an upper surface 212 of the base plate 21 preferably is approximately 2.5 mm, for example. The stator core 221 is obtained by stacking a plurality of magnetic steel plates 221a. The thickness of one magnetic steel plate 221a preferably is approximately 0.2 mm, for example. The number of the magnetic steel plates 221a is preferably six or seven, for example. In the present preferred embodiment, the number of the magnetic steel plates 221a is preferably six, for example. A height H1 of the stator core 221 in the axial direction preferably is approximately 1.2 mm, for example. The height H1 does not include the thicknesses of insulating films provided on an upper surface and a lower surface of the stator core 221. The ratio of the height H1 of the stator core 221 to a height H2 of the stator 22 in the axial direction, that is, the core height ratio Hr is preferably about 50% or more and about 70% or less, for example. The height H2 is a height from a lower end to an upper end of the coil 222. In the present preferred embodiment, the height H2 of the stator 22 preferably is approximately 2.4 mm, for example.

A thickness T1 of the rotor magnet 32 in the radial direction is preferably about 0.7 mm or more and about 1.0 mm or less, for example. The thickness T1 does not include the thickness of an insulating film provided on a front surface of the rotor magnet 32. An air gap G1 that is the distance in the radial direction between the rotor magnet 32 and the stator core 221 is preferably about 0.15 mm or more and about 0.20 mm or less, for example. The air gap G1 is the shortest distance in the radial direction between an outer circumferential surface of a tooth 52 and an inner circumferential surface of the rotor magnet 32. The outer circumferential surface of the tooth 52 refers to an outer surface of the plurality of stacked magnetic steel plates 221a. In a case where the insulating film is provided on the outer surface of the magnetic steel plate 221a, the thickness of the insulating film is included in the air gap G1. The inner circumferential surface of the rotor magnet 32 refers to an inner circumferential surface of the insulating film provided on the front surface of the rotor magnet 32. The thickness of the insulating film of the rotor magnet 32 is not included in the air gap G1.

In the motor 12a of the disk drive apparatus 1a having the thickness of about 5 mm, in a similar way to the disk drive apparatus 1 having the thickness of about 7 mm, it is preferably designed in a way so as to shorten the startup time while generating sufficient torque in the limited space. In order to generate sufficient torque, the motor 12a is preferably designed so that the torque constant Kt is about 3 mN·m/A or more and about 4.5 mN·m/A or less, for example. Further, in order to shorten the startup time, the motor 12a preferably is designed so that the motor constant Km is about 1 mN·m/(A·√Ω) or more and about 2 mN·m/(A·√Ω) or less, for example.

In the motor 12a, as described above, the thickness T1 of the rotor magnet 32 in the radial direction preferably is about 0.7 mm or more and about 1.0 mm or less, and the air gap G1 preferably is about 0.15 mm or more and about 0.20 mm or less, for example. In the motor 12a, compared with the motor of the disk drive apparatus having the thickness of about 9.5 mm, it is possible to increase the density of magnetic flux generated between the rotor magnet 32 and the stator core 221 while preventing an increase in size in the radial direction in the limited space. Consequently, it is possible to generate sufficient torque when the motor 12a is driven in the limited space, and to shorten the startup time of the motor 12a.

Figure 23:
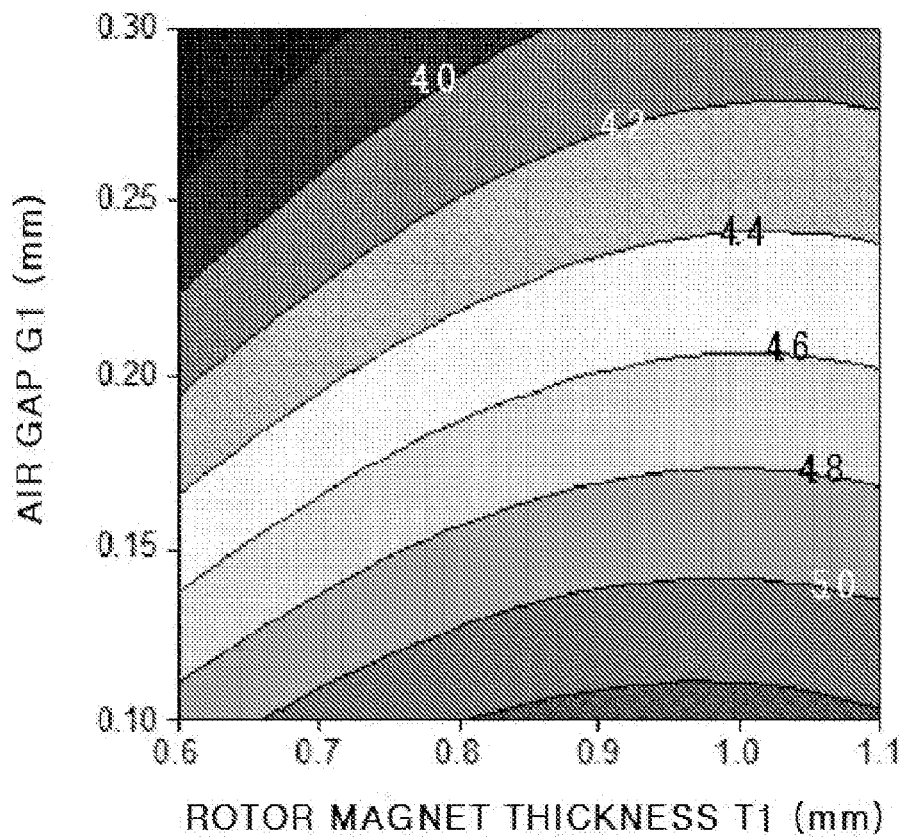
FIG. 23 is a diagram illustrating the relationship between the thickness of a rotor magnet and an air gap and a torque constant according to a preferred embodiment of the present invention.

FIG. 23 is a contour diagram illustrating the relationship between the thickness T1 of the rotor magnet 32 of the motor 12a shown in FIG. 22 and the air gap G1, and the torque constant Kt. A plurality of curves in FIG. 23 represents contours of the torque constant Kt, and the torque constant Kt increases from the upper left to the lower right in FIG. 23. The contours of the torque constant Kt are calculated by the same simulation as in FIG. 6.

Referring to FIG. 23, if the thickness T1 of the rotor magnet 32 is changed without change in G1 in a range where the air gap G1 is about 0.15 mm or more and about 0.20 mm or less, the torque constant Kt gradually increases as T1 increases in a range where T1 is about 1.0 mm or less. On the other hand, the torque constant Kt gradually decreases as T1 increases in a range where T1 is larger than about 1.0 mm. That is, by setting T1 to about 1.0 mm or less, for example, the magnetic flux density increased according to the increase of T1 is effectively used in the increase of the torque constant Kt. Further, if T1 is smaller than about 0.7 mm, for example, the reduction ratio of Kt to the reduction of T1 relatively increases. Accordingly, by setting T1 to about 0.7 mm or more and about 1.0 mm or less, for example, it is possible to efficiently increase the torque constant Kt while preventing the rotor magnet 32 from being increased.

Figure 24:
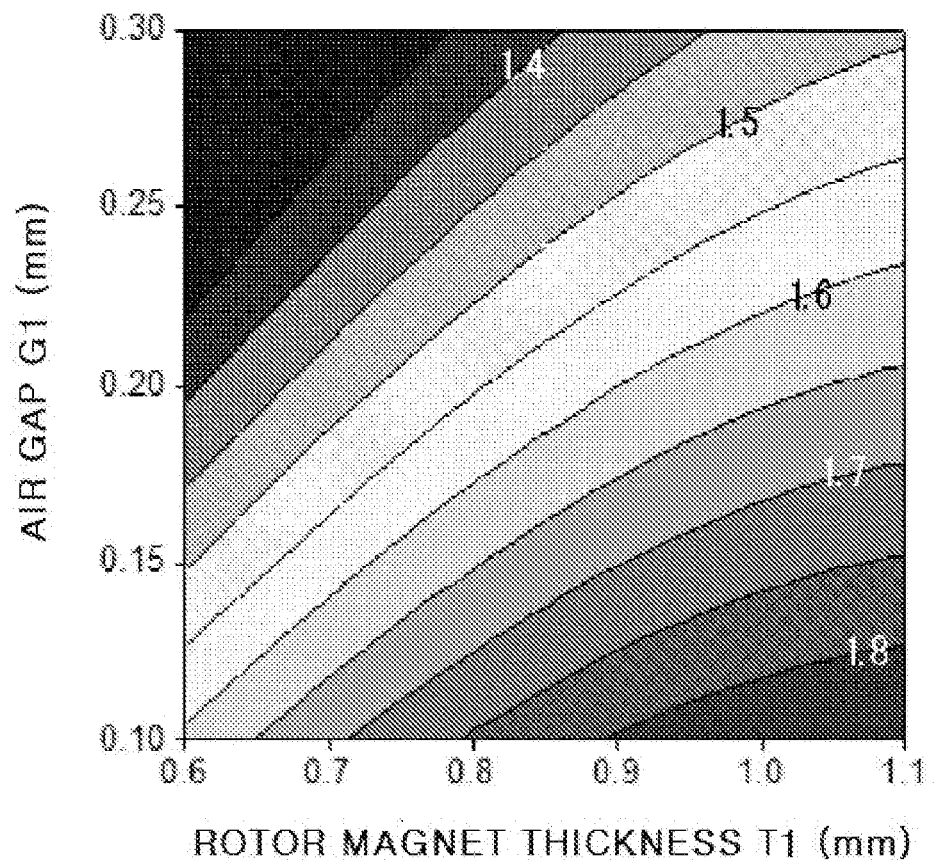
FIG. 24 is a diagram illustrating the relationship between the thickness of a rotor magnet and an air gap and a motor constant according to a preferred embodiment of the present invention.

FIG. 24 is a contour diagram illustrating the relationship between the thickness T1 of the rotor magnet 32 of the motor 12a shown in FIG. 22 and the air gap G1, and the motor constant Km. A plurality of curves in FIG. 24 represents contours of the motor constant Km, and the motor constant Km increases from the upper left to the lower right in FIG. 24. The contours of the motor constant Km are calculated by the same method as in the contours of the torque constant Kt. According to FIG. 24, if T1 is changed without change in G1 in a range where the G1 is about 0.15 mm or more and about 0.20 mm or less, the motor constant Km gradually increases as T1 increases in a range where the above-described T1 is about 0.7 mm or more and about 1.0 mm or less, for example. That is, the magnetic flux density increased according to the increase of T1 is effectively used in the increase of the motor constant Km.

As described above, in the motor 12a shown in FIG. 22, the thickness T1 of the rotor magnet 32 preferably is about 0.7 mm or more and about 1.0 mm or less, and the air gap G1 preferably is about 0.15 mm or more and about 0.20 mm or less, for example. In this way, by reducing T1 and G1, it is possible to increase the outer diameter of the stator core 221 while preventing an increase in the size of the motor 12a in the radial direction. Thus, even in the thin motor 12a in which the inner height H3 is relatively small, it is possible to increase the upper limit of the number of turns of the coil 222. Consequently, it is possible to easily realize the torque constant Kt and the motor torque Km of a desired size.

In the motor 12a, by setting the torque constant Kt to about 3 mN·m/A or more and about 4.5 mN·m/A or less, for example, it is possible to efficiently generate sufficient torque while suppressing the amount of electric current. Further, by setting the motor constant Km to about 1 mN·m/(A·√Ω) or more and about 2 mN·m/(A·√Ω) or less, for example, it is possible to shorten the startup time of the motor 12a.

FIGS. 25 to 28 respectively show results obtained by calculating the core height ratio Hr, the motor constant Km, the torque constant Kt and the number of layers of the conducting wire 223 while variously changing the height H1 of the stator core 221 and the diameter D1 of the conducting wire 223 in a case where the inner height H3 of the motor 12a shown in FIG. 22 is about 2.5 mm, for example.

Figure 25:
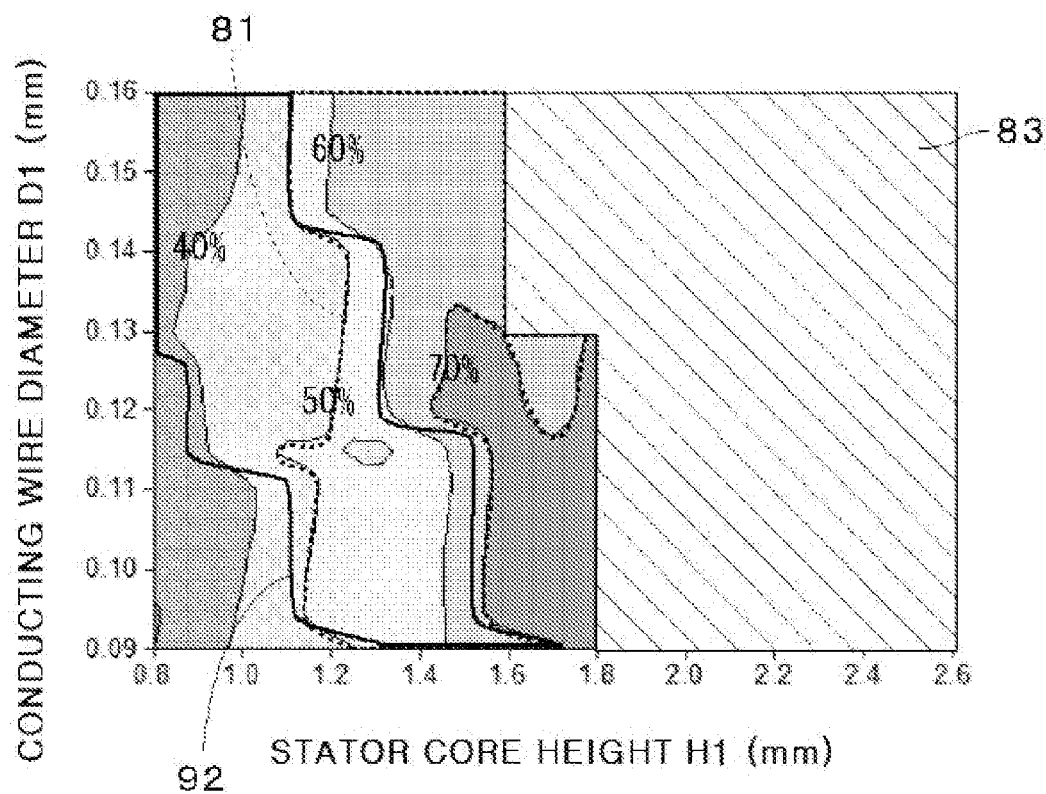
FIG. 25 is a diagram illustrating the relationship between the height of a stator core and the diameter of a conducting wire and a core height ratio according to a preferred embodiment of the present invention.

FIG. 25 is a contour diagram illustrating the relationship between the height H1 of the stator core 221 of the motor 12a shown in FIG. 22 and the diameter D1 of the conducting wire 223, and the core height ratio Hr. In FIG. 25, in a similar way to FIG. 8, a region where the core height ratio Hr is about 50% or more and about 70% or less is surrounded by a thick broken line with reference numeral 81. A region 83 indicated by parallel slanted lines on the right side in FIG. 25 represents a region where the coil 222 cannot be provided due to the relationship between the inner height H3, the height H1 of the stator core 221, and the diameter D1 of the conducting wire 223. This is similarly applied to a region 83 in FIGS. 26 to 28.

Figure 26:
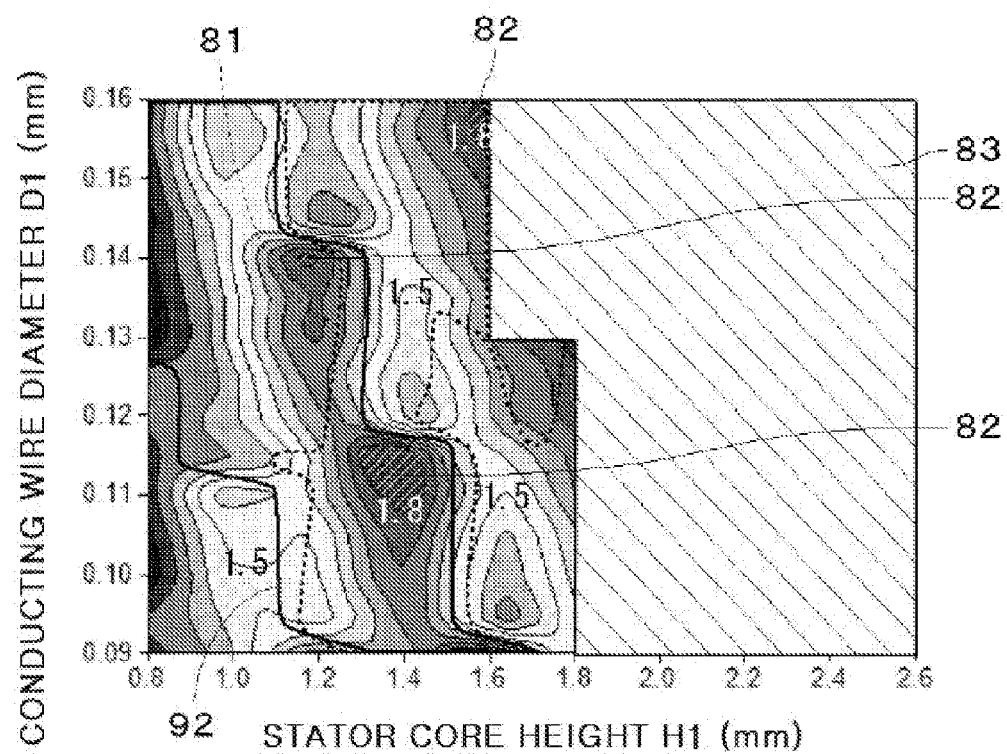
FIG. 26 is a diagram illustrating the relationship between the height of a stator core and the diameter of a conducting wire and a motor constant according to a preferred embodiment of the present invention.

FIG. 26 is a contour diagram illustrating the relationship between the height H1 of the stator core 221 of the motor 12a shown in FIG. 22 and the diameter D1 of the conducting wire 223, and the motor constant Km. Regions 82 indicated by parallel slanted lines represent regions where the motor constant Km is the maximum in FIG. 26. The motor constant Km is small on the left side in FIG. 26, gradually increases from the lower left to the upper right, and becomes a peak in a range where H1 is about 1.1 mm or more and about 1.5 mm or less. Further, if the motor constant Km passes the peak, the motor constant Km decreases once toward the upper right, and then increases again. A region surrounded by a thick broken line with reference numeral 81 represents a region where the core height ratio Hr is about 50% or more and about 70% or less, in a similar way to FIG. 25, and includes the regions 82 where the motor constant Km in FIG. 26 is the maximum. In this way, by setting the core height ratio Hr to about 50% or more and about 70% or less, for example, it is possible to efficiently increase the motor constant Km.

Figure 27:
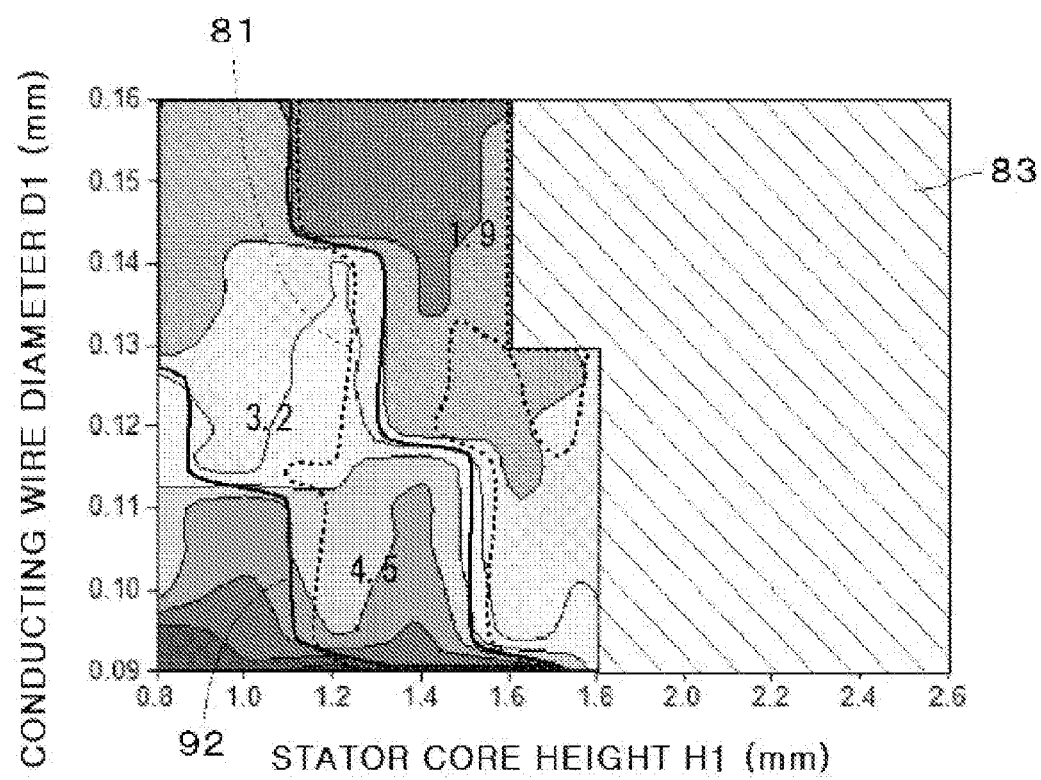
FIG. 27 is a diagram illustrating the relationship between the height of a stator core and the diameter of a conducting wire and a torque constant according to a preferred embodiment of the present invention.

FIG. 27 is a contour diagram illustrating the relationship between the height H1 of the stator core 221 of the motor 12a shown in FIG. 22 and the diameter D1 of the conducting wire 223, and the torque constant Kt. The torque constant Kt increases from the upper side to the lower side in FIG. 27. A region surrounded by a thick broken line with reference numeral 81 represents a region where the core height ratio Hr is about 50% or more and about 70% or less, in a similar way to FIG. 25. The region surrounded by the thick broken line 81 includes a region where the torque constant Kt is about 3 mN·m/A or more and about 4.5 mN·m/A or less.

Figure 28:
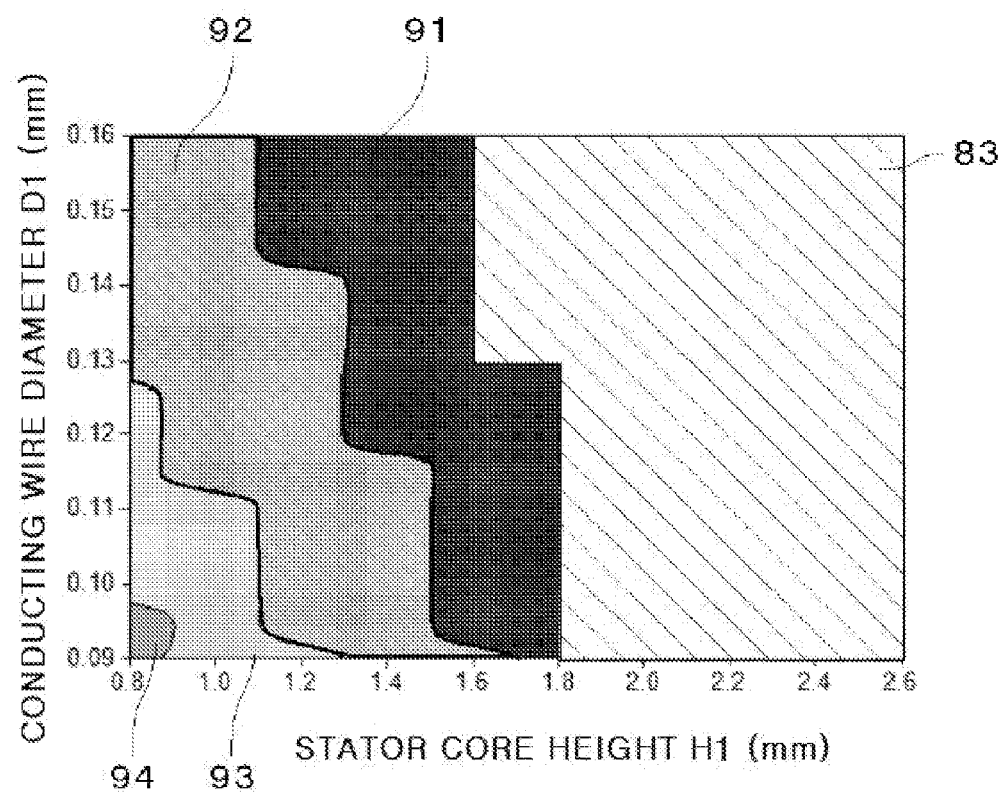
FIG. 28 is a diagram illustrating the relationship between the height of a stator core and the diameter of a conducting wire and the number of layers of the conducting wire according to a preferred embodiment of the present invention.

FIG. 28 is a diagram illustrating the relationship between the height H1 of the stator core 221 of the motor 12a shown in FIG. 22 and the diameter D1 of the conducting wire 223, and the number of layers of the conducting wires 223. Regions 91 to 94 that are arranged from the upper right to the lower left in FIG. 28 respectively represent regions where the number of layers of the conducting wire 223 is two, four, six, and eight. In FIGS. 25 to 27, the region 92 in which the number of layers of the conducting wire 223 is four is indicated by a thick solid line. As shown in FIG. 25, in the region 92 where the number of layers of the conducting wire 223 is 4, the core height ratio Hr is about 50% or more and about 70% or less in a portion of about ½ from the right. As shown in FIGS. 26 and 27, a region where the region 92 and the region 81 where the core height ratio Hr is about 50% or more and about 70% or less are overlapped includes the regions 82 where the motor constant Km is the maximum, and includes the region where the torque constant Kt is about 3 mN·m/A or more and about 4.5 mN·m/A or less.

In FIGS. 17 and 18 illustrating a case where the inner height H3 preferably is about 3.0 mm, the region 81 includes the regions 82 where the motor constant Km is the maximum, and includes the region where the torque constant Kt is about 3 mN·m/A or more and about 4.5 mN·m/A or less, for example. Further, a region where the region 92 and the region 81 are overlapped also includes the regions 82 where the motor constant Km is the maximum, and includes the region the torque constant Kt is about 3 mN·m/A or more and about 4.5 mN·m/A or less, for example.

In the disk drive apparatus 1a having the thickness of about 5 mm, the inner height H3 that can be realized is about 2.5 mm or more and about 3.0 mm or less, for example. As described with reference to FIGS. 16 to 19 and FIGS. 25 to 28, by setting the core height ratio Hr of the motor 12a shown in FIG. 22 to about 50% or more and about 70% or less, it is possible to efficiently increase the motor constant Km in the range of 1 mN·m/(A·√Ω) or more and 2 mN·m/(A·√Ω) or less while setting the torque constant Kt to about 3 mN·m/A or more and about 4.5 mN·m/A or less, for example.

As described above, in the motor 12a, by setting the torque constant Kt to about 3 mN·m/A or more and about 4.5 mN·m/A or less, for example, it is possible to efficiently generate sufficient torque while suppressing the amount of electric current. Further, by setting the motor constant Km to about 1 mN·m/(A·√Ω) or more and about 2 mN·m/(A·√Ω)mN or less, for example, it is possible to shorten the startup time of the motor 12a. In the motor 12a, by setting the number of layers of the conducting wire 223 to four, it is possible to easily set the core height ratio Hr to about 50% or more and about 70% or less, for example. Consequently, it is possible to efficiently generate sufficient torque while suppressing the amount of electric current, and to easily realize the motor 12a in which the startup time is short.

In the motor 12a, as described above, the inner diameter of the stator core 221 preferably is about 8 mm or more and about 9 mm or less. By setting the inner diameter of the stator core 221 to about 9 mm or less, for example, it is possible to increase the length of the tooth 52 in the radial direction. Thus, it is possible to increase the upper limit of the number of turns of the coil 222 while preventing an increase of the inner height H3 of the disk drive apparatus 1a. Further, by setting the inner diameter of the stator core 221 to about 8 mm or more, for example, it is possible to easily install the stator core 221 to the base plate 21.

In the motor 12a, the diameter of the conducting wire 223 preferably is about 0.10 mm or more and about 0.15 mm or less, for example. The number of turns of each coil 222 preferably is about 40 or more and about 80 or less, for example. In the motor 12a, compared with the motor of the disk drive apparatus having the thickness of about 9.5 mm, it is possible to increase the upper limit of the number of turns while preventing an increase of the resistance value of the coil 222 in the limited space. Accordingly, it is possible to generate sufficient torque when the motor 12a is rotated in the limited space, and to shorten the startup time of the motor 12a.

In the stator 22, by setting the number of the magnetic steel plates 221a to six or seven, it is possible to easily set the core height ratio Hr to about 50% or more and about 70% or less, for example. By using a magnetic steel plate having a thickness of about 0.2 mm, for example, that is easily available as the magnetic steel plate 221a, it is possible to reduce the manufacturing cost of the stator core 221. In the stator core 221, the magnetic steel plate 221a having various thicknesses and numbers may be used. The thickness of the magnetic steel plate 221a may be about 0.15 mm or about 0.3 mm, for example.

Further, the motor 12a is not only applied to the disk drive apparatus having the width of about 2.5" and the thickness of about 5 mm, but may also be applied to a disk drive apparatus having a width of about 2.5" and a thickness of about 4 mm, a width of about 2.5" and a thickness of about 3 mm, or the like, for example.

The disk drive apparatuses 1 and 1a of the above described preferred embodiments of the present invention may be variously modified. For example, in the motor 12 and 12a, a base bracket installed to the first housing member 141 may be used as a base portion, instead of the base plate 21. In the disk drive apparatuses 1 and 1a, a plurality of female screw portions may be defined in the cover portion 311 of the rotor hub 31 in the circumferential direction, and the clamper 151 may be fixed to the female screw portion.

Features of the above-described preferred embodiments and modifications thereof may be combined appropriately as long as no conflict arises.

The preferred embodiments of the present invention and modifications thereof may be used as a spindle motor of a disk drive apparatus, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor of a disk drive apparatus, comprising:
a base unit;
a stator that includes a stator core and a plurality of coils mounted to the stator core and is disposed above the base unit;
a covered cylindrical rotor hub that includes a cover portion positioned above the stator and a side wall portion extending downward from an outer edge of the cover portion;
a rotor magnet that is positioned outside the stator in a radial direction thereof and is fixed to an inner circumferential surface of the side wall portion of the rotor hub; and
a bearing mechanism that supports the rotor hub and the rotor magnet to be rotatable with respect to the base unit and the stator; wherein
the rotor magnet is made of a neodymium bond magnet;
a thickness of the rotor magnet in the radial direction is about 0.7 mm or more and about 1.0 mm or less;
a distance between the rotor magnet and the stator core in the radial direction is about 0.15 mm or more and about 0.20 mm or less;
a torque constant Kt of torque generated between the stator and the rotor magnet is about 4 mN·m/A or more and about 6 mN·m/A or less; and
a motor constant Km is about 2 mN·m/(A·√Ω) or more and about 4 mN·m/(A·√Ω) or less.

2. The spindle motor of the disk drive apparatus according to claim 1, wherein
the stator core is defined by a plurality of stacked magnetic steel plates; and
the number of the plurality of stacked magnetic steel plates is in a range of eight to twelve, and a thickness of each of the plurality of magnetic steel plates is about 0.2 mm.

3. The spindle motor of the disk drive apparatus according to claim 1, wherein an inner diameter of the stator core is about 8 mm or more and about 9 mm or less.

4. The spindle motor of the disk drive apparatus according to claim 1, wherein a number of turns of each of the plurality of coils is about 40 or more and about 80 or less.

5. The spindle motor of the disk drive apparatus according to claim 1, wherein a diameter of a conducting wire of the plurality of coils is about 0.10 mm or more and about 0.15 mm or less.

6. The spindle motor according to claim 1, wherein the spindle motor is adapted for use in a disk drive apparatus having a width of about 2.5" and a thickness of about 7 mm or less.

7. A disk drive apparatus comprising:
the spindle motor according to claim 1 arranged to rotate a disk;
an access unit that performs at least one of reading and writing of information with respect to the disk;
a clamper that clamps the disk to the rotor hub; and
a housing that accommodates the disk, the spindle motor, the access unit and the clamper.

8. A spindle motor of a disk drive apparatus, comprising:
a base unit;
a stator that includes a stator core and a plurality of coils mounted to the stator core and is disposed above the base unit;
a covered cylindrical rotor hub that includes a cover portion positioned above the stator and a side wall portion extending downward from an outer edge of the cover portion;
a rotor magnet that is positioned outside the stator in a radial direction thereof and is fixed to an inner circumferential surface of the side wall portion of the rotor hub; and
a bearing mechanism that supports the rotor hub and the rotor magnet to be rotatable with respect to the base unit and the stator; wherein
the rotor magnet is an Nd—Fe—B bond magnet;
a thickness of the rotor magnet in the radial direction is about 0.7 mm or more and about 1.0 mm or less;
a distance between the rotor magnet and the stator core in the radial direction is about 0.15 mm or more and about 0.20 mm or less;
a torque constant Kt of torque generated between the stator and the rotor magnet is about 3 mN·m/A or more and about 4.5 mN·m/A or less; and
a motor constant Km is about 1 mN·m/(A·√Ω) or more and about 2 mN·m/(A·√Ω) or less.

9. The spindle motor of the disk drive apparatus according to claim 8, wherein
the stator core is defined by a plurality of stacked magnetic steel plates; and
a number of the plurality of stacked magnetic steel plates is one of six or seven, and a thickness of each of the plurality of magnetic steel plates is about 0.2 mm.

10. The spindle motor of the disk drive apparatus according to claim 8, wherein an inner diameter of the stator core is about 8 mm or more and about 9 mm or less.

11. The spindle motor of the disk drive apparatus according to claim 8, wherein a number of turns of each of the plurality of coils is about 40 or more and about 80 or less.

12. The spindle motor of the disk drive apparatus according to claim 8, wherein a diameter of a conducting wire of the plurality of coils is about 0.10 mm or more and about 0.15 mm or less.

13. The spindle motor according to claim 8, wherein the spindle motor is adapted for use in a disk drive apparatus having a width of about 2.5" and a thickness of about 5 mm or less.

14. A disk drive apparatus comprising:
- the spindle motor according to claim 8 arranged to rotate a disk;
- an access unit that performs at least one of reading and writing of information with respect to the disk;
- a clamper that clamps the disk to the rotor hub; and
- a housing that accommodates the disk, the spindle motor, the access unit and the clamper.

* * * * *